(12) United States Patent
Plewa et al.

(10) Patent No.: US 7,411,181 B2
(45) Date of Patent: Aug. 12, 2008

(54) SYSTEM AND METHOD FOR MANIPULATING AND PROCESSING MATERIALS USING HOLOGRAPHIC OPTICAL TRAPPING

(75) Inventors: Joseph Plewa, Park Ridge, IL (US); Evan Tanner, Chicago, IL (US); Dan Mueth, Chicago, IL (US); Lewis Gruber, Chicago, IL (US); Kenneth Bradley, Hinsdale, IL (US)

(73) Assignee: Arryx, Inc., Chicago, IL (US)

( * ) Notice: Subject to any disclaimer, the term of this patent is extended or adjusted under 35 U.S.C. 154(b) by 0 days.

(21) Appl. No.: 10/974,976

(22) Filed: Oct. 28, 2004

(65) Prior Publication Data

US 2005/0122550 A1 Jun. 9, 2005

Related U.S. Application Data

(60) Provisional application No. 60/543,488, filed on Feb. 11, 2004, provisional application No. 60/531,254, filed on Dec. 20, 2003, provisional application No. 60/519,407, filed on Nov. 12, 2003, provisional application No. 60/515,092, filed on Oct. 28, 2003, provisional application No. 60/515,091, filed on Oct. 28, 2003.

(51) Int. Cl.
*G02B 5/18* (2006.01)
*G02B 15/32* (2006.01)

(52) U.S. Cl. .......................... 250/251; 359/296; 359/566
(58) Field of Classification Search .................. None
See application file for complete search history.

(56) References Cited

U.S. PATENT DOCUMENTS

| | | | | |
|---|---|---|---|---|
| 6,055,106 A | * | 4/2000 | Grier et al. | 359/566 |
| 6,139,831 A | * | 10/2000 | Shivashankar et al. | 530/351 |
| 6,416,190 B1 | * | 7/2002 | Grier et al. | 359/614 |

* cited by examiner

*Primary Examiner*—David A. Vanore
(74) *Attorney, Agent, or Firm*—Jean C. Edwards, Esq.; Akerman Senterfitt

(57) ABSTRACT

A method and apparatus for manipulating particles (micro, nano, and pico) having one or more characteristics with an optical trap formed by modulating a laser beam with a Diffractive Optical Element (DOE). At least one characteristic of the material is selected; and a laser beam having a selected wavelength corresponding to the at least one selected characteristic of the material is generated. Values of the DOE are calculated corresponding to the at least one selected characteristic of the material. The beam and the DOE are modulated to produce a holographic optical trap having properties corresponding to the at least one selected characteristic. The trap is focused to a beam focus or selected spot size; and the beam focus is located near a particle location for trapping the particle therein.

49 Claims, 23 Drawing Sheets

SYSTEM AND METHOD FOR MANIPULATING AND PROCESSING MATERIALS USING HOLOGRAPHIC OPTICAL TRAPPING

CROSS REFERENCE TO RELATED APPLICATIONS

The present invention is related to and is a conversion to a full utility application of the following provisional applications:

60/543,488, filed Feb. 11, 2004.
60/519,407, filed Nov. 12, 2003.
60/515,091, filed Oct. 28, 2003.
60/515,092, filed Oct. 28, 2003.
60/531,254 filed, Dec. 20, 2003

The teachings of the applications identified above are incorporated herein by reference.

BACKGROUND OF THE INVENTION

The present invention relates to a system and method for manipulating and processing nanomaterials, micromaterials and picomaterials using holographic trapping.

Nano materials may be generally described as materials and structures characterized as having at least one dimension in the nano-region. These materials have many and various applications. Nano materials include elemental materials e.g. clumps of elemental atoms, such as gold; and more ordered structures such as nanotubes and buckey balls. Nanotubes are hollow symmetrical objects formed of one or more atomic or molecular layers of particular interest are nanotubes made of carbon. Buckey balls are hollow spheres of atomic or elemental carbon. Other examples of nanomaterials and ordered nanostructures are discussed below.

Nanotubes are particularly interesting nanostructures because their extraordinary mechanical, electrical, and optical properties enable a large array of applications. Nanotubes made from carbon offer the high degree of versatility associated with carbon structures, for example, the ability to interface with DNA molecules. Sustained nanotube research for over a decade has created a myriad of successful technologies. Insulating materials impregnated with nanotubes can be turned into conductors. Nanotube-reinforced materials are being developed for their improved mechanical strength. Researchers have grown large arrays of aligned nanotubes for use as electron emitters in displays.

Other applications are envisioned which capitalize on the unique properties of carbon nanotubes. These applications include bulk materials with enormous elastic module, nanotube based electronic components, and structures employing nanotubes for guiding light.

There are widely acknowledged challenges in the development of many of these technologies. One challenge involves the separation or purification of nanomaterials based on structural properties such as their chirality, diameter, length, and other properties. Recent progress involving the separation of various species of nanotubes, for example, make use of specific bonding to DNA, or employ electrophoresis. Another serious challenge involves the manipulation of nanomaterials for controlled assembly, deposition, and orientation. Although methods exist for certain types of deposition, the capability to move single objects in three dimensions and to pattern large groups of objects is still lacking.

SUMMARY OF THE INVENTION

The present invention is based upon the discovery of a method for manipulating materals or particles having one or more characteristics, with an optical trap formed by modulating a laser beam with a diffractive optical element (DOE). According to the method, at least one characteristic of the material is selected; a laser beam having a selected wavelength corresponding to the at least one selected characteristic of the material is generated; calculated values of the DOE corresponding to the at least one selected characteristic of the material are selected; the beam and the DOE are modulated to produce a holographic optical trap having properties corresponding to the at least one selected characteristic; the trap is focused; and the beam focus is located near a particle location for trapping the particle therein.

According to a further aspect, the invention comprises, observing the functionality of the trap; recalculating the DOE values in response to the observation in order to adjust the functionality; and repeating the observation and recalculating steps until satisfactory functionality is achieved for the at least one selected characteristic.

According to the invention the functionality of the trap may be varied by sculpting its shape. Various aspects of the invention involving manipulating of particles include one or more of:

moving the trapped particle to a selected location;
attaching a portion of the trapped particle to a surface or another particle;
selectively heating selected ones of the attached particles for establishing selected flow patterns in adjacent media;
stabilizing the particle in position;
heating the particle with trap energy;
moving the particle for collision with a proximate object;
deforming the particle with a shock wave to perforate a proximate object;
arranging particles in a selected pattern;
selectively heating particles arranged in a selected pattern for establishing corresponding selected flow patterns of adjacent media;
trapping a particle in a first selected trap having a first functionality; and superimposing a second selected trap on the particle having a second functionality;
depositing particles on a surface;
depositing particles on a surface in parallel axial alignment normal to the surface;
depositing particles on a surface in parallel axial alignment parallel to the surface;
removing particles from a surface of a body;
ablading particles from a surface;
sorting particles according to their characteristics, including at least one of size, shape, length, conductivity, dielectric constant; refractive index; chilarity; thermal absorbtivity;
selectively heating particles in a medium for causing expansion of the medium;
selectively heating particles in a medium having a channel therein for causing the medium to expand and thereby close the channel;
discriminating particles based upon size, functionality, absorbence, fluoresence, chirality, and length; and
sensing energy emitted from the particles in response to incident radiation.

A system and method consistent with the present invention allows various industrial polymers and biopolymers to be attached to nanotubes and nanostructures. These polymers may in turn be attached to functionalized colloidal spheres. The spheres facilitate manipulation of the nanostructures with optical tweezers. In addition, holographic optical trapping may then be employed to pattern and control large quantities of nanostructures both on and off substrates.

Systems and methods consistent with the present invention employing holographic optical trapping enable and enhance a variety of technique for manipulation and processing of nanomaterials and nanostructures.

An exemplary embodiment of the present invention comprises a method for controlling nanotubes using a cloud of optically trapped nanospheres which facilitate manipulation and patterning of the tubes. Holographic optical trapping confers distinct advantages in this area because the shapes of the traps may be intricately sculpted, allowing detailed control of the cloud of nanospheres which in turn allows much more versatile manipulation of the nanotubes.

The invention comprises an apparatus employing a diffractive optical element (DOE) such as a spatial light modulator; digital light processor or other diffractive element and a laser modulated thereby to produce a hologram for trapping nanoparticles.

The invention also includes products produced by the methods and various apparatus disclosed herein.

DETAILED DESCRIPTION OF THE INVENTION

Figure 1:
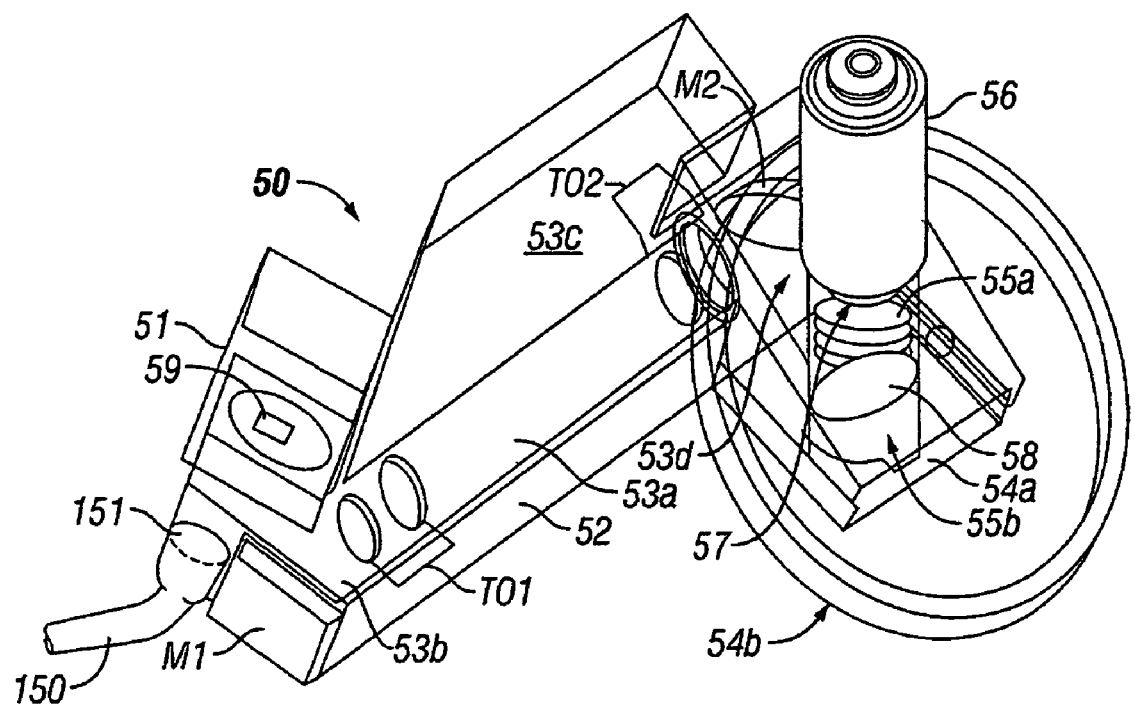
FIG. 1 depicts a component view of an exemplary compact system to form optical traps for practicing methods consistent with the present invention.

Particular embodiments of the invention are described below in considerable detail for the purpose of illustrating its principles and operation. However, various modifications may be made, and the scope of the invention is not limited to the exemplary embodiments described below. For example, although the invention is described by using nanomaterials and sometimes micromaterials as the exemplary embodiments, it should be understood that the invention has applications over a broad range of materials sizes from the micro regime around 1 mm or less down to the pico regime around 0.1 nm, and it is intended that such applications are included in the invention.

As used herein, the term nano refers to particles, materials and structures which have a characteristic size in the nano region, i.e. particles having a sub-micron characteristic dimension of less than $10^{-6}$ m. These particles may be atoms, molecules, agglomerations of such atomic, and molecular materials and elemental materials or may be ordered arrays of atomic or molecular materials. Nano materials may also include without limitation pharmaceuticals, bio materials and aggregated metals from sea water. They may also include regions where molecules are in solution or minute particles are in suspension. When it is useful for purposes of explanation, the particular structure of the nanoparticle, nanomaterial, or nanostructure is described. Often the terms are used interchangeably. Sometimes nano is used alone and it should be generally understood that nano in such case refers to the class of these materials; or to the dimension as in nano-meters (nm). The context of the discussion without extensive qualification should make it apparent to those of skill in the art as to what is being described. Likewise the micromaterials may be less than 1 mm and the picomaterials may be less than 0.1 nm.

Manipulation of nanoparticles is difficult to achieve and requires an assortment of tools which are difficult to master. It is known, for example, that one or more particles in the micro region of about $10^{-6}$ m may be captured and manipulated using a holographic technique which employs a Dynamic Optical Element (DOE) to produce a hologram. In an exemplary embodiment, the DOE may be a spatial light modulator (SLM) to modulate a laser beam. The DOE may also be a digital light processor (DLP), or a fixed exposure holographic plate mounted on a spinning stage or the like. Rather than trapping one microparticle at a time, the DOE produces a plurality of beamlets for trapping a plurality of microparticles. It is likewise known that nanoparticles may be optically trapped using a holographic laser techniques. However, it has been extremely difficult to optically trap most nanoparticles individually using conventional techniques and the difficulty extends to holographic techniques as well.

The reason for this difficulty is that microparticles, i.e. particles larger than $10^{-6}$ m are usually trapped in a regime known as the Ray Optics regime. In this regime, the particle is generally much larger than the beam diameter. Nanoparticles exist in the Rayleigh regime, wherein the particle is much smaller than the beam diameter. The difference is not simply a matter of scale. To draw a rough analogy, the difference is like using a flashlight in a darkened room to locate a basket ball versus a dust particle. Other comparisons may be made, but the important thing is that the difference in size is sufficiently great that known techniques for the micro regime are not readily adapted or practical for the nano regime without significant modifications. However, as hereinafter discussed, it is possible to employ known apparatus using new methods to achieve desired results in the nanoregion.

As used herein the term manipulation broadly covers any technique where a nanoparticle is affected by incident energy. This includes trapping, moving, dislodging, heating, ablating, or the like. The reason for such a definition is that techniques for accomplishing one may be readily adapted to accomplish another. For example, as discussed hereinafter, it is possible to trap and heat a nanoparticle simultaneously or separately, and achieve various results depending on which technique is employed either alone or in combination.

Apparatus

FIG. 1 illustrates the component view of one embodiment of a compact system consistent with the present invention for forming one or more optical traps. The system includes a phase patterning optical element 51 comparing a dynamic optical element, with a reflective, dynamic surface. An exemplary device is a phase only spatial light modulator such as the "PAL-SLM series X7665," manufactured by Hamamatsu of Japan, the "SLM 512SA7" or the "SLM 512SA15" both manufactured by Boulder Nonlinear Systems of LaFayette, Colo. In another exemplary embodiment, the DOE is Texas Instruments digital light processor (DLP) employing micromirrors. These dynamic optical element have an encodable reflective surface in which a computer controls a hologram formed herein.

The optical element 51 is aligned with, or attached to, a housing 52 through which a first light channel 53a is provided. One end 53b of the first light channel is in close proximity to the optical element 51, the other end 53c of the first light channel intersects with and communicates with a second light channel 53d formed perpendicular thereto. The second light channel is formed within a base 54a of a microscope lens mounting turret or "nosepiece" 54b. The nosepiece 54b is adapted to fit into a Nixon TE 200 series microscope (not shown). The second light channel communicates with a third light channel 55a which is also perpendicular to the second light channel. The third light channel 55a traverses from the top surface of the nosepieces 54b through the base of the nosepieces 54a and is parallel to an objective lens focusing lens 56. The focusing lens has a top and a bottom forming a back aperture 57. Interposed in the third light channel between the second light channel and the back aperture 57 of the focusing lens is a dichroic mirror beam splitter 58. Other components within the compact system for forming the optical traps 50 include a first mirror M1, which reflects the beamlets emanating from the phase patterning optical element through the first light channel, a first set of transfer optics TO1 disposed within the first light channel, aligned to receive the beamlets reflected by the first mirror M1, a second set of transfer optics TO2 disposed within the first light channel, aligned to receive the beamlets passing through the first set of transfer lenses TO1, and a second mirror M2, positioned at the intersection of the first light channel and the second light channel, aligned to reflect beamlets passing through the second set of transfer optics TO2 and through the third light channel 55a.

To generate the optical traps, a laser beam (not shown) is directed through an optical fiber 150 out a collimator end 151 and reflected off the dynamic surface 59 of the optical element 51. The beam of light (not shown) exiting the collimator end 151 of the optical fiber 150 is diffracted by the dynamic surface 59 of the optical element 51 into a plurality of beamlets (not shown). The number type and direction of each beamlet may be controlled and varied by altering the hologram encoded in the dynamic surface medium 59. The beamlets then reflect off the first mirror M1 through the first set of transfer optics TO1 down the first light channel 53a through the second set of transfer optics TO2 to the second mirror M2; and are directed at the dichroic mirror 58 up to the back aperture 57 of the objective lens 56, are converged through the objective lens 56, thereby producing the optical gradient conditions necessary to form the optical traps. That portion of the light which is split through the dichroic mirror 58, for imaging, passes through the lower portion of the third light channel 55b forming an optical data stream (not shown).

In those embodiments in which the phase profile of the beamlets is less intense at the periphery and more intense at regions inward from the periphery, overfilling the back aperture 57 by less than about 15 percent is useful to form optical traps with greater intensity at the periphery than optical traps formed without overfilling the back aperture 57.

Figure 2:
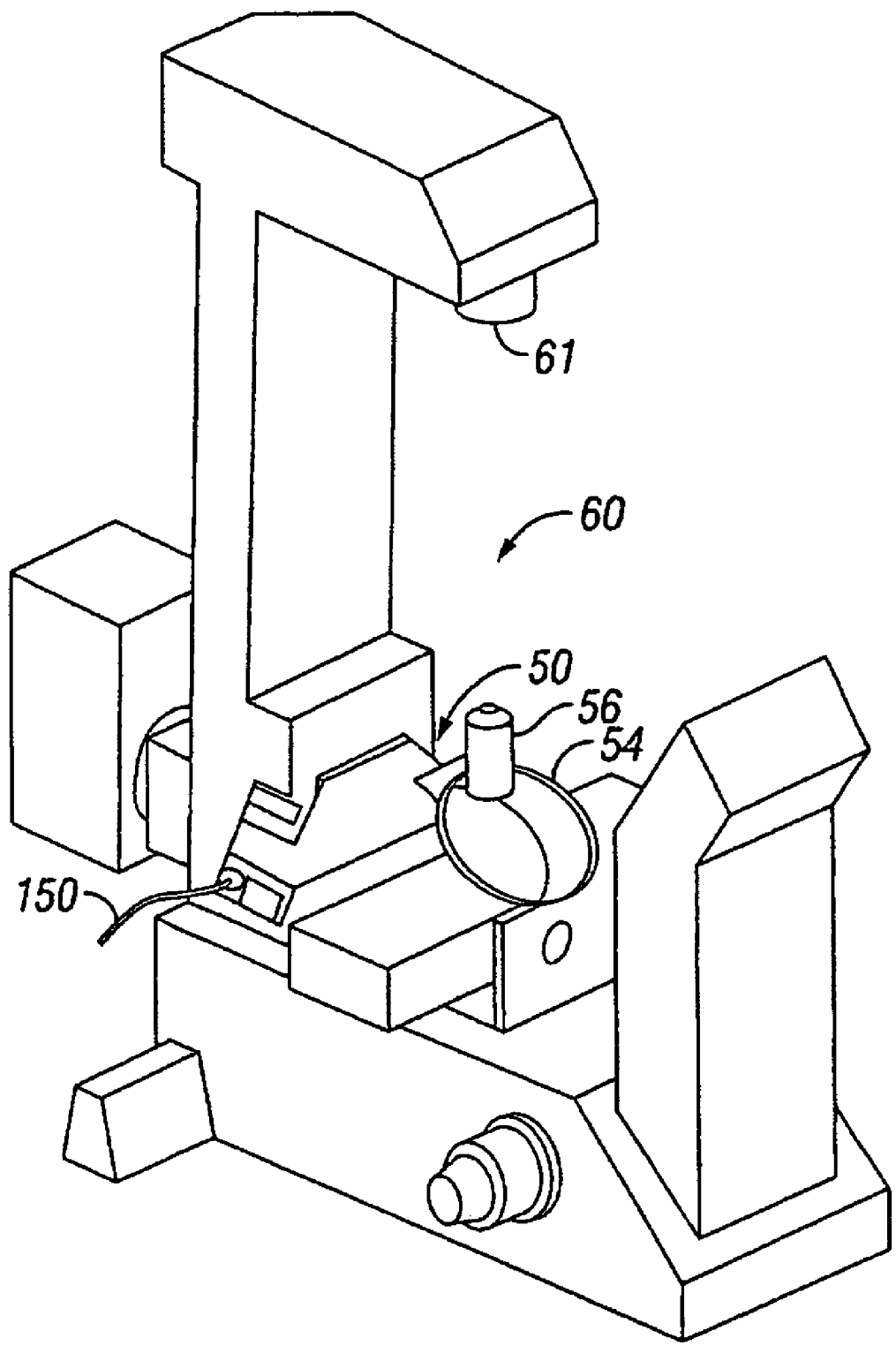
FIG. 2 illustrates an inverted microscope to which the compact system of FIG. 1 attaches.

FIG. 2 is an elevational view of a Nixon TE 200 series microscope into which the compact system 50 for forming the optical trap (FIG. 1) has been mounted. The nosepiece 54b with the attached housing 52 fits directly into the microscope via the mount (not shown) for the nosepieces 54a and 54b. The housing and its contents and attached optical element 51 are secured to the nosepiece 54a and 54b require few or no alternations or modifications to the remainder of the miscrope. For imaging, an illumination source 61 may be provided above the objective lens 56.

The first and second set of transfer optics TO1 and TO2 are shown containing two lens elements each. The lenses can be either convex or concave. Different and varying types and quantity of lenses such as symmetrical air spaced singlets, symmetrical air space doublets and/or additional lenses or groups of lenses, can be chosen to achieve the image transfer from the first mirror M1 to the second mirror M2. In some embodiments the first and second set of transfer optics are symmetrical air spaced doublets, spaced at a distance to act in combination as a telephoto lens.

The compact system 50 shown in FIG. 1 for forming one or more optical traps is one embodiment of an optical tweezer. Optical tweezers provided a powerful method for controlling nanomaterials. In particular, holographic optical trapping enables the use of optical trapping for manipulating a large number of nanostructres e.g. nanotubes or nanotube assemblies in these dimensions. These manipulations take advantage of holographic optical trapping, for example, the creation of modes of light beyond standard Gaussian traps, to control nanostructures including nanotubes in a variety of useful ways.

In addition to standard Gaussian optical traps, modes of light such as optical vortices, may be employed to rotate structures. Optical vortices are also useful for breaking up nanostructures. Bessel beams, because of the long aspect ratio of their trapping region, may be used to trap many nanostructures such as nanofibers, or long single fibers.

The manipulation of these nanos with optical tweezers may be augmented by cutting or welding technologies that join or sever nanos. For example, the tweezing laser may be appropriately employed for this purpose, or a secondary laser may be used.

Furthermore, radiation pressure and heat may be used to deposit the manipulated nanoobject onto a surface. This controlled nano deposition allows complex patterns to be written.

In addition to individual nanos, the ability to manipulate groups of nanos may be used to form nano-based materials. For example, nanotubes may be assembled to form materials, or the nanotubes in existing materials may be processed by the holographic optical tweezers, in order to adjust, for example, their position or orientation. A particular example of this technology is in the area of solar cells. Many new solar cell materials involve nanotubes. However, a huge barrier in creating efficient materials has been the ability to align the nanotubes during the creation of the material. Holographic optical trapping provides this capability.

An important application for holographic optical tweezers is for sorting nanotubes. This sorting process is critical at two stages of nano processing. The first stage involves the purification of the nano (removing "non-tube" material). Holographic optical trapping is adept at sorting materials based on size and consistency, and may be employed for this sorting stage. The second stage involves sorting nano based on their properties, for example sorting conducting from semiconducting nanotubes. This separation has been traditionally extremely difficult because the nanotubes can be extremely similar in make-up, size, and shape, except for the chirality of the nanotube structure. The interaction with light in holographic optical traps provides a useful method for sorting based on this chirality. For example, optical vortices may be employed, because they impart varying amount of momentum to different chiral structures. Furthermore, because light interacts differently with materials of differing conductivity, Gaussian or Bessel beam traps may be used for sorting based on conductivity. In general, the differing interaction of light with nanotubes of different length, thickness, chirality, or conductivity may be used to sort nanotubes with holographic optical traps.

Different traps having different modes (shapes or optical characteristics) may be employed to manipulate nanostructures having different characteristics. For example, Bessel traps have a characteristic light distribution in the form of a hollow cylinder i.e., the region inside the cylinder is essentially dark because the light forming the trap destructively interferes, whereas the light on the surface constructively interferes. The light distribution in a Bessel trap varies such that an elongated object may be captured within the trap and manipulated accordingly. A Bessel trap is sometimes referred to as an optical bottle.

A Gaussian trap has a characteristic light distribution that varies as a Gaussian function, that is the light falls off on each side of a maximum. It is also possible to produce a Gaussian-like distribution having two peaks in certain applications.

Holographic Gold Deposition

Optical traps may be used to manipulate particles with a variety of shapes, sizes, and consistencies. Metals of various sizes have been optically trapped. Optical trapping systems involving beams coming from just one direction involve balance of forces in the direction of propagation of the beam. The trapping force tends to pull the particle toward the focus of the trap, the radiation pressure tends to force the particle back and out of the trap. A good trap will trap the particle just slightly downstream from the focal point of the trap. However, by intentionally allowing radiation pressure to dominate particles may be guided in a stream by the laser trap and directed toward the surface of a material. These particles and surfaces are chosen so that particles may be deposited on the surface in a desired pattern. For example, nano sized gold particles may be deposited in a pattern. An annealing step may be utilized to modify properties of the pattern, such as its connectivity.

Because there are some thermal fluctuations in the position of the deposited particles, the nano particles are deposited with micron scale accuracy. However, a feedback system may be utilized to nudge the particle and achieve accuracy at the nanometer scale. A high speed spatial light modulator may be employed to modify the trapping laser with the appropriate speed.

Holographic optical trapping also makes possible a massive parallelization of this process, enabling many patterns to be written simultaneously, a feature attractive for manufacturing of integrated circuits. The three dimensional positioning possible with optical traps enables construction of multi-level circuits and structures.

Thermal effects from tweezers in fluids are very strong and may be used to create strong loci of concentration of materials. These thermal effects can be controlled with great precision by employing holographic optical trapping to create a plurality of tweezers. Thus "thermal tweezing" may be employed to generate flows of nanotubes for sorting purposes, or to move large groups of nanotubes at a time. Deposition of thermally aggregated nanotubes may also be implemented.

Exemplary Images

Figure 3A:
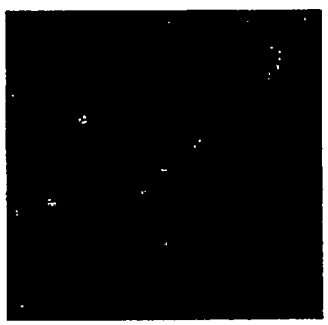
FIG. 3A depicts an exemplary dispersion of single-walled nanotubes in a target sample disposed in relation to the optical trapping system of FIG. 1.

FIG. 3A shows a dispersion of exemplary single-walled nanotubes in water with 0.5% solutions of SDS surfactant to stabilize the nanotubes. Dark field microscopy is used to image the tubes.

Figure 3B:
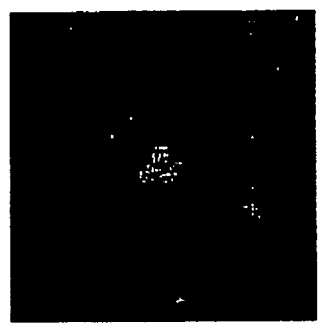
FIG. 3B depicts an exemplary group of the single-walled nanotubes that have been aggregated by the optical trapping system of FIG. 1 using laser to form a photo convective trap.

FIG. 3B shows a group of these nanotubes that have been aggregated with a photoconvective trap.

Figure 3C:
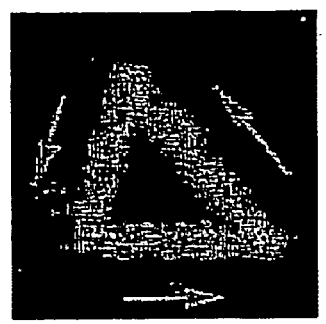
FIG. 3C depicts a time average of multiple frames illustrating the ability of the optical trapping system of FIG. 1 to move trapped nanotubes in a pre-determined pattern before the nanotubes are deposited on a substrate.
Figure 3D:
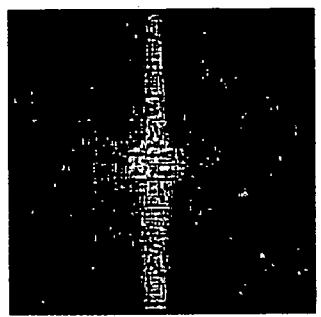
FIG. 3D depicts a burst of intense light produced by the optical trapping system of FIG. 1 to saturate a CCD camera when depositing the aggregated nanotubes onto the substrate.

FIG. 3D shows the burst of intense light that saturates the CCD camera when depositing the tubes onto the substrate.

Figure 3E:
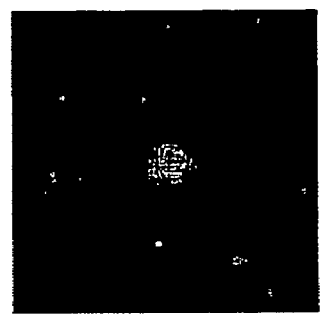
FIG. 3E depicts nanotubes deposited by the optical trapping system of FIG. 1 onto the substrate.

FIG. 3E shows the nanotubes deposited onto the substrate.

FIG. 3C shows a time average of several frames that indicate the ability to move the trapped nanotubes (before they have been deposited) in a pre-determined pattern with the holographic optical traps.

Figure 3F:
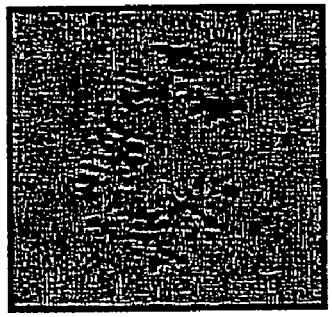
FIG. 3F depicts a bright-field image illustrating the deposition of aggregated nanotubes in a particular pattern by the optical trapping system of FIG. 1.

FIG. 3F is a bright-field image which shows the deposition of the nanotubes in a particular pattern.

Figure 3G:
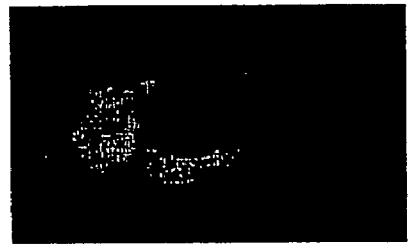
FIG. 3G depicts a dark field image illustrating the trapping and partial extraction of a nanotube rope or fiber from a bundle of nanotubes by the optical trapping system of FIG. 1
Figure 3J:
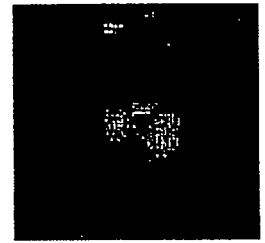
FIG. 3J depicts trapping and rotating of a several bundles of nanotubes by the optical trapping system of FIG. 1 configured to produce an optical vortex.
Figure 3K:
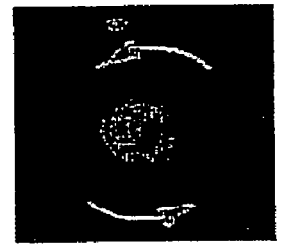
FIG. 3K depicts a time average of several frames illustrating a rotation pattern of the bundle of nanotubes generated by the optical trapping system of FIG. 1 when rotating the nanotubes using an optical vortex.
Figure 3H:
FIG. 3H depicts another dark field image illustrating further extraction of the nanotube rope or fiber shown in FIG. 3G from a bundle of nanotubes by the optical tapping system of FIG. 1.
Figure 3I:
FIG. 3I depicts another dark field image illustrating the completed extract of the nanotube rope shown on FIGS. 3G and 3H from a bundle of nanotubes by the optical trapping system of FIG. 1.

FIGS. 3G through 3I are dark field images showing the extraction of a nanotube rope from a bundle of nanotubes.

A FIG. 3J shows the rotation of a bundle of nanotubes by a charge I=10 optical vortex.

FIG. 3K is a time average of several frames showing the rotation pattern.

Figure 3L:
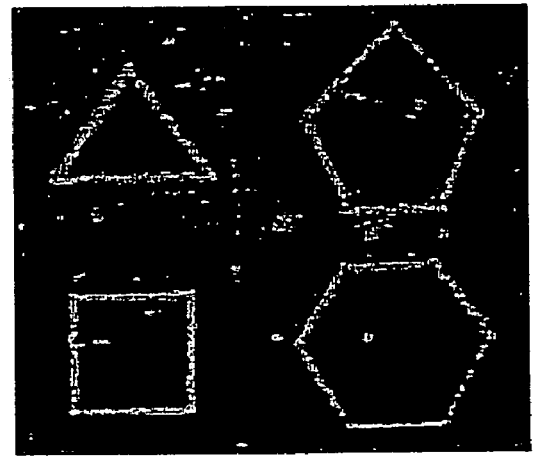
FIG. 3L depicts multiple patterns produced in parallel by the optical trapping system of FIG. 1 when configured to focus the lasers of the system for holographic etching on a sheet of nanotubes deposited on a glass surface.

FIG. 3L shows multiple patterns produced in parallel by the optical trapping system of FIG. 1 via holographic etching with the lasers on a sheet of nanotubes deposited on a glass surface substrate.

The facility with which holographic optical traps manipulate nanos, as well as process nano-based materials opens an enormous class of applications. Because of the differences in interaction of the laser light with different chiralities of the nanotubes, established holographic optical sorting methods may be employed to sort nanotubes based on all the important parameters, including the chirality. The ability to align nanotubes provides a solution to materials processing challenges that are currently unmet, such as aligning nanotubes in materials for added strength or for improvements in conductivity.

Manipulation of Elongated Nanostructures

A variety of techniques for manipulating nanoparticles and other elongated particles are introduced below. Specific examples related to the accompanying drawings follow the introduction.

Ablating Gold Electrodes

Holographic optical tweezers may be used to ablate coatings from surfaces. For example, gold may be removed in order to generate patterns. Furthermore, the tweezers may be used to remove material from an existing pattern, creating finer features than may be otherwise possible. For example, electrodes may be etched to make electrodes with much smaller features, enabling measurements that would otherwise be impossible.

Parallel Ablation Microprocessing of Various Materials

Microfluidic chips are growing in importance, especially for lab-on-a-chip applications. Driving such chips with holographic optical tweezers makes possible complex control of valves, pumps, syringes, and other features necessary for accurate control of chip functionality. In addition, laser ablation of plastic may be used for creation of microfluidic channels. Clear plastic is used to form a thin (~400 micron) sheet on a glass slide. The plastic either absorbs light from the laser, in which case melting by the beam is used to clear material, or is ablated by the laser, in which case channels re formed by etching away material. A holographic optical tweezer system is employed to create multiple, independently controllable, three-dimensional spots of light for processing the substrate. The spots are moved across the substrate, removing material and forming multiple channels simultaneously. The advantages of using a holographic optical tweezer system are many. Multiple channels may be written simultaneously, reducing manufacturing time. Because the beams are steerable, moving the microscope stage is unnecessary. This improves resolution, as the beams are positionable to within 15 nm. Also, because the holograms are three-dimensional, complex three-dimensional patterns may be created. In addition to plastic, the technique applies to other materials such as at least one of a nanotube; agglomerated elemental gold; platinum; titanium; DNA; a thermal absorber; colloidal spheres; polymers; bio polymers; quantum dots; pharmaceutical; and bio materials.

Holographically Generated Configurable Gold Wires

Holographic Optical Trapping makes possible the manipulation of gold nanoparticles with laser beams. Using Bessel Beams, lines of gold particles may be created, effectively creating wires made of gold. These wires may be dynamically reconfigured as discussed below. The ability to create multiple Bessel traps means that complex networks of interconnects may be generated.

Holographic optical tweezers may define time dependent, point like positions in a three dimensional region. The points defined are separate volumes of light intensity that preferentially attract (or hold) or, alternatively, repel (or exclude), objects at or near these points. Thus, this light forms an array of preferential locations in space. Time dependent control of these points allows a moving array of preferential locations where each individual location may contain one or more objects of differing sizes, shapes or composition. In addition, individual points or collections of points may be turned on and off, thereby making array locations appear and disappear in time.

This invention is an extension to forming time dependent arrays in space, and it comprises forming connections of various types between array locations. Using forms of light that provide one dimensional rather than point like light intensity regions (e.g., Bessel Beam), a network structure of interconnected points may be formed in a three dimensional region. This network structure may be time dependent, that is, connections between particular points may be turned on and off at various times or moved. Such movement may track the movement of a collection of points defined by either an array such as the one described above or points defined in some other way. For example, objects may be fixed in space using some other mechanism. In addition, a new array may be formed either superimposed on an array of points as set forth above, or one that is formed completely independently of such an array. This new array is defined only by the endpoints of the two dimensional structures of light formed.

An example of such a network structure is the concentration of conducting nanoparticles (e.g., gold particles) that would form into conducting networks (or "wires") created by the presence of one dimensional networks of light intensity maxima projected into a solution of conducting particles whose average size is on the order of, or smaller than, the skin depth of the particle at the wavelength of the light forming the network.

As another example, it is useful to consider mixtures of particles. In such a solution of conducting particles, some with sizes larger than those particle's, others with sizes smaller than these other particles' skin-depth, the network of light described in the previous example creates linear connections of the first type of particle, and along the same linear network, wires of exclusion of the second type of particle. If the larger and smaller particles have different conductivities, varying the degree of attraction and repulsion of the two types of particles would result in a network of varying resistances between the endpoints of the linear structures (the array "points"). In this way, variable resistances may be obtained throughout the network structure.

An inventive extension of this idea is to form connections between collections of closed one dimensional structures by creating surfaces of light. Applications of this concept involves the creation of virtual capacitors to combine electro-osmotic separations with optical peristaltic or other optical sorting mechanisms, or the creation of complex novel optical elements using optically induced layering such as negative dielectric materials.

Fast Destruction, Ablation or Killing of Fixed Diffusion or Motile Materials

In manufacturing and processing, an important step is often the removal, destruction, ablation, or killing of compounds, materials, waste products, or biological elements. Light may be used as the energy source for tail removal, destruction, ablation, or killing mentioned above. Beams of light, with widely varying and controlled, power and spatial distributions may be applied to material through both scanning and by focusing mechanisms. These beams may remove, cut, sculpt or kill in precise fashion. As discussed below, the effect will be referred to as sculpting the sample. An implementation uses a galvo-driven mirror to move a pulsed beam from one area to another where the sculpting, removal, destruction or killing is desired to occur.

An exemplary implementation is one in which a controlled array of alternatively reflective (or absorbing) and transmissive material is placed above the sample to be affected by the light. Examples of such an array are a MEMS mirror array and a phase array passing only one polarization of light. When every portion of the array is in a reflective (or absorbing) mode, the system is off. Selectively turning on elements of the array turns on the sculpting effect in a time and spatially dependent way. Both continued sculpting of one sample may be effected. In the case of sample material moving through the sample space, one or more sculpting patterns may be imposed on samples moving past the array. Feedback between measurement systems and the sculpting tool may be used to impose sample dependent sculpting patterns on the samples. This system may be implemented with either a pulsed or continuous source of light. One or more beams of light may be used to illuminate the controlled array and thereby provide the sculpting power. Alternatively, one or more diffractive optical elements may be used to create beams for each element of the controlled array. If the diffractive optical element or elements are dynamic, such as in the case of a SLM, the diffractive optical element may perform both the multiple beam creation function and controlled array function in one device.

Another embodiment employs a single light beam directed through an acoustic optical cell (AOC). Such an arrangement may be employed to direct the light to different regions in a sample. Using a pulsed source, the light may be directed to sites on one or more samples requiring sculpting. In this way a single laser may be used to sculpt many sites in a sample region. During light pulses, where no sculpting is desired, the AOC may direct those light pulses to a beam block outside the sample region.

This implementation may also be effected with a continuous beam. A controlled beam interrupter upstream of the AOC gives the user the option of performing continuous sculpting or of turning on and off the light beam in a manner consistent with the AOC performance and the sample being sculpted. Feedback between measurement systems and the sculpting tool may be used to impose sample dependent sculpting patterns on the samples as well.

Thermal Based Trapping with Holographic Optical Tweezers

In general, thermal effects generated by laser tweezers on strong absorbers are much stronger than trapping effects on even non absorbing specimens. Holographic optical tweezers allow the utilization of these thermal effects for object manipulation. Absorbing particles may first be trapped with holographically generated optical bottles. These bottles are then maneuvered near an object. Thereafter a point trap is generated on the absorbing particle. Large flows may then be generated which may be used to guide the motion of the neighboring particle. Also thermal effects may be used to heat specified trapped particles, deposited particles and specified areas in order to create desired media and particle flows.

In another embodiment, particles are trapped and manipulated in two dimensions by employing a chamber which has deposited on it a layer of absorbing material which may be heated with a pattern of lasers which generate a flow which tends to drive particles toward the center of the pattern, but only when those particles lie within a certain radius which is determined by the pattern.

Yet another embodiment involves a fluid which absorbs in a two-photon process. This allows preferential heating at trap locations. By heating with the appropriate three dimensional pattern, particles are drawn to the center of the heating pattern, but only patterns within a certain radius which is determined by the pattern.

Holographic Optical Tweezers for Control of Micro Fluidic Flows

Holographic Optical Trapping is an extremely versatile technology that has enabled a wide range of applications. Trapping with lasers, however, suffers from the fact that the forces generated by laser traps are inherently, relatively weak. However, forces generated by the thermal effects of laser traps may be quite strong. These thermal effects may be realized by introducing microscopic absorbers, such as graphite particles, into the system of interest: By embedding these particles into a microfuidic channel large fluid flows may be generated, providing a source of powerful pumps. In addition, the versatility of holographic optical traps allows that these pumps be large in, number, and allows their three-dimensional positioning.

Another embodiment of the system involves depositing absorbing patterns onto a surface which allow directed heating of the surface anywhere along the pattern. By depositing a thin coating of a material that absorbs laser radiation over the glass surface, a surface is generated which may heat at any location, allowing flows to be designed with great precision. Holographic optical trapping allows a plurality of traps to be created, each of which may have variable power. This allows flows to be sculpted which move particles in arbitrary paths. Furthermore, since the traps are placed dynamically, the flows are: easily reconfigured in time, enabling various forms of chemical processing and fluid computation.

The calculation of the appropriate flow patterns is aided by the analogy with electrostatic fields. The flows in their simplest form are two dimensional, resulting either from the heating of discrete particles, patterns, or continuous surfaces: This is a pseudo two dimensionality because the flows are fundamentally convective and therefore three dimensional. However, it is useful to focus on only the layer of the flow where the heating occurs, and thereby recover a two dimensional system. This is natural in many cases because often the particles or packets being transported are not density matched to their surrounding fluid.

Even three dimensional flows may be sculpted by employing a fluid which absorbs the laser radiation. The ability to create three-dimensional traps makes possible heating anywhere in the three dimensional chamber. By using a fluid which only absorbs in a two photon process, the heating may be localized to only the focal point of the traps, rather than cones of light in front of and behind the traps. Bessel beams may be used beneficially to heat in columns. Other modes of light may be similarly utilized. Thermal effects may also be used alone or in combination with optical trapping to manipulate particles.

Holographic optical trapping may be combined with holographic optical tweezers employed for microfluidic flows. All the standard holographic optical trapping static and dynamic sorting techniques may be used to affect the particles in flows generated using the thermal technique.

Optical Control of Micro Fluidic Devices

Microfluidic chips consist of open channels, which may be filled with a fluid, which are created in a surrounding material. Frequently, the chips are planar in that all the channels lie in a plane. Such devices may be made, for example, by etching into a flat surface of a material and bonding a second flat material to its face. More complex devices may be three dimensional (3D) in the channels and do not all lie in a single plane. Such a device may be made, for example, by bonding a stack of multiple thin layers of PDMS, each of which has channels defined in them.

While a number of techniques have been established for constructing microfluidic devices, control of fluids or solutions within the microfluidic chips is still difficult. There are three common flow control methods: (1) Pressure driven flow in which the pressure of one or more of the channel inlets and outlets is controlled, such as with a syringe pump or pneumatic membrane. In most cases, all or almost all inlet and outlet pressures should preferably be precisely controlled. (2) Electro-osmotic flow (EOF), wherein the voltages at two or more of the channel inlets and outlets is controlled. With appropriate control of the fluid and channel wall properties, an ion concentration along the wall may flow along the channel surface, pulling the fluid in the channel with it. (3) Intrinsic peristaltic valving/pumping under pneumatic control using a flexible material for the channel wall, allows one to create neighboring air channels under pneumatic control which may be expanded to valve close a fluidic channel. Multiple valves may be placed adjacent to each other to form a peristaltic pump.

In each of these techniques the system should preferably be completely or almost completely closed. The components should preferably be fairly rigid to avoid stretching of the components which lead to very long relaxation times when pressures are changed. The number of control lines scales linearly with the number of inlets and outlets. Thus, it is bulky and expensive for more than only a few inlets and outlets.

The flows in EOF are hard to control precisely. The surfaces should preferably be prepared in a very reproducible manner; the fluids should preferably have appropriate and controlled properties; a single chip's behavior tends to age; and multiple devices made in a similar manner often behave differently. For slow flows (<10 um/s or 100 um/s), such as those which optical tweezers may hold particles against, pressure driven flows due to tiny variations in the fluid columns on different inlets and outlets may dominate the EOF flow. Thus, EOF works best for fast flows and precise control over system chemistry is important.

Pneumatic control lines scale better than pressure driven flow and EOF due to the possibility of multiplexing. However, numerous bulky and expensive pressure manifolds may be important to control a micro-fluidic chip. The control lines should preferably be built into the initial chip design and may result in very complex chips. In some cases, it may limit the chip designs which are possible or add to the expense of the chips themselves.

In accordance with the invention, appropriately constructed microfluidic devices may be made which respond directly to light. One manifestation is to manufacture pockets of light absorbing dye in a soft material chip (e.g., one made from PDMS). When light of the appropriate wavelength and intensity is shone on the dye reservoir the reservoir expands, pressing the channel and partially or completely closing the channel. The light may be a collimated beam, focused onto the reservoir; or in another configuration. A second manifestation is to incorporate a light-absorbing dye into the continuous soft chip material (e.g., PDMS). When light is shone onto a region of the chip wall, it absorbs the light, heating and expanding. If sufficient light is shone on a region of the chip wall neighboring a channel, the channel may be partially or completely closed, creating a valve. In this manifestation, a valve may be produced at any part of a channel even though extra effort or consideration may not have been given at design time. In most manifestations, multiple such valves may be coupled to produce one or more peristaltic pumps.

For complex, 3D microfluidic chips, light-induced valving scales well. Because the wall material may be substantially transparent to the light, one may valve a channel which is surrounded by other channels. This would be done by focusing the light to a point at the position where heating is desired. Thus, enabling a 3D microfluidic device for valving or pumping may generally be no more effort than enabling a 2D microfluidic device for valving or pumping.

For controlling flow, this design shares many of the same benefits as the pneumatically controlled chips. One does not need to control fluid column heights, control pressures on each inlet and outlet, or precisely control the surface and fluid chemistry. Instead, the peristaltic pumping is locally controlled and the flow rate is given by geometry and the rate at which the light is pulsed. Thus, it should be robust against aging, surface chemistry, fluid properties, and external environmental factors.

For systems which already employ optical trapping in the fluidic chips, this design has the added benefit that the optical tweezers may be employed not only for manipulating objects, but also for controlling the microfluidic valves.

Holographic Optical Control of Bubbles or Cell Injection

Recent reports have demonstrated that ultrasonically created bubbles, when hit with a pressure pulse from a shock wave, create a long proboscis, which may be used to pierce a cellular membrane. Because of the versatility of the phase profiles which may be generated with holographic optical traps, these traps may be used to manipulate bubbles. This in turn means that the combination of these technologies allows fully controllable tools for piercing cell membranes. The use of multiple sources of shock wave generators, allows the orientation of the proboscis. Indeed, holographically generated sound waves allow minute control of this orientation.

Zepto Syringe

Holographic tweezers may also serve a critical purpose in driving microfluidic components. Lab on chip applications, which allow sophisticated studies with microscopic quantities of reagents, require microfluidic chambers with components like pumps and valves. For applications requiring precise and uniform injection of fluid, a sphere could be trapped and pushed through a column with a diameter similar to that of the sphere. Any fluid in the column would be expelled from the column, forming a microsyringe. Because of the ten nm tweezing resolution, and because of the ability to tweeze objects that are only tens of manometers in size, this microsyringe would be able to expel fluid with accuracy measured in 1/10,000 of a femtoliter, or tens of zeptoliters. This would facilitate experiments where only miniscule quantities of reagents are available, or where the expense of such reagents is prohibitive. A series of such syringes surrounding a central chamber could be controlled by holographic tweezers in a precisely timed sequence which would make possible for the first time studies of the complex interactions between a variety of chemicals or biological molecules. Any valves that may be important are easily realized by blocking or unblocking channels with tweezed spheres. This lab-on-a-chip does not even need to be planar. The ability to tweeze in three dimensions allows for complex geometries, including stacks of chambers which may be driven simultaneously, or spherical microinjection chambers.

Electrostatic forces between the sphere and the surrounding wall, mediated by intervening fluid may be extremely large. These forces may easily be larger than the 100 or so piconewtons that an optical tweezer may exert. This means that it is important to avoid the likelihood of such an adhesion taking place. One way to do this is by controlling the ionic strength of the solution in the tube. As a general solution, this is difficult because it would reduce the reagents available for injection to a select few with extremely low ionic strength. A better solution is to use microspheres which have polymers tethered to their surface. These polymers prevent adhesion of the sphere to the surface through steric repulsion. The polymers are very short, typically nanometers in length, and should not interfere with the fluid pumping function of the syringe.

Gene Insertion Using Optical Tweezers and Laser Pulses

Often a biological cell or small object needs to be altered for a particular application. This may require physical changes, such as cutting of a cell membrane or deformation of a polymer, or chemical changes, such as the introduction of a particular protein or DNA sequence into a cell. A method to accomplish this involves the use of a small object that essentially serves as a projectile with which to penetrate, deform, or otherwise affect a target object. The projectile, for example a bead, is selected for its response to a short laser pulse. Projectiles within the range of 10 nanometers to 10 microns may be used for this purpose. For example, Bangs Laboratories, Inc. manufactures 0.97 micron diameter silica beads that may be used for this process. The projectile will be imparted with a large momentum when it is hit with a chosen laser pulse. Positioning of the projectile in a sample (e.g. microscope slide) may be performed with an optical tweezer apparatus. Use of a holographic optical trapping device like the Arryx BioRyx® 200 system confers additional functionality. When the projectile is placed near the target in the desired position, a laser pulse is focused and fired at it. These pulses can be generated by a laser cutter such as the MicroPoint 2203™ from Photonic Instruments, Inc. Both the heat generated and resulting momentum can result in various effects on the target object. The projectile may be used to penetrate a cell, and be used further within the cell to deliver a particular chemical or physically affect organelles and structures within the cell. This may be used in a similar manner to a gene gun, but with the ability to selectively target individual cells and without the requirement for a particular type of projectile (e.g. one made of tungsten). Alternately, the projectile may deform or cut the edge of the target object, when it is positioned near the edge. The projectile may also become embedded in the target object, or pass through it entirely. With holographic optical tweezers, any number of projectiles may be positioned, actively or passively, over a group of cells and fired in succession, limited by the firing rate of the laser pulse and the speed with which the pulse focus can be moved. The combination of laser pulse energy, duration, wavelength, and projectile size and makeup determines the momentum imparted to the projectile. These parameters can be adjusted in order to control penetration of the projectile into the target. For example, controlled penetration into the cell wall, cytoplasm, or cell nucleus may all be achieved.

The foregoing introductory descriptions are further detailed below. For example the invention is adapted to manipulate nonmaterial in order to deposit such materials in patterns on a surface.

Figure 4A:
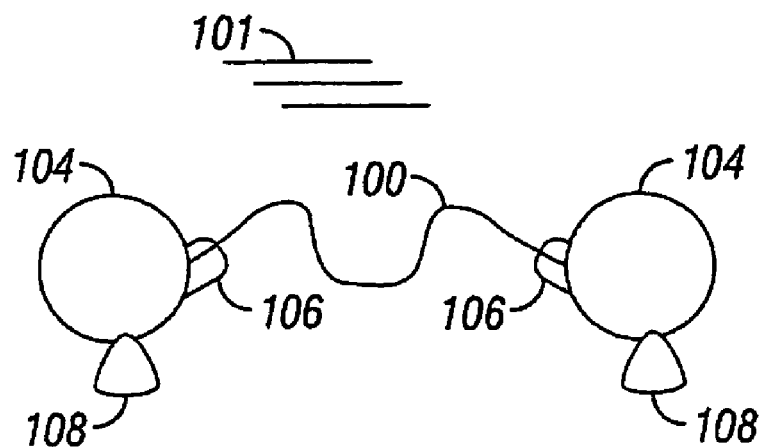
FIGS. 4A and 4B illustrate a technique for manipulating elongated nanoparticles using colloidal spheres bonded to the ends of the particles.
Figure 4B:
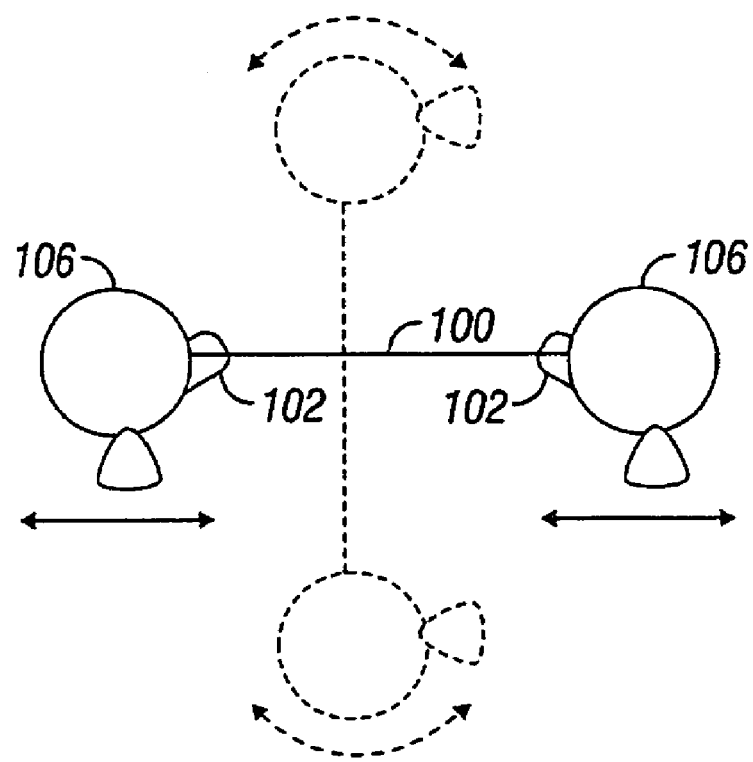

FIGS. 4A and 4B illustrate a technique for manipulation of elongated nanostructures. It should be understood that the various nanomaterials including nanoparticles and nanostructures are typically suspended in a volume of liquid medium. In FIG. 4A a nanotube 100 is suspended in a medium 101 illustrated as an exemplary elongated nanostructure. The nanotube 100 has end portions 102. The ends 102 are attached to colloidal spheres 104 by means of an intermediary species compatible with the nanotubes 100. The intermediary species 104 may be an industrial polymer or a biopolymer. The colloidal sphere 104 may be appropriately functionalized so as to be compatible with the intermediary species.

As shown in FIGS. 4A and 4B, optical traps 108 may be employed as optical tweezers to tweeze the individual colloidal spheres 104 and to move the spheres in various directions independently. For example, in FIG. 4B, the spheres may be moved in opposite directions to stretch out the tube 100. Alternatively, the tube 100 may be oriented in space by rotating the spheres with respect to each other between the position shown in solid line and the position shown in phantom line.

Figure 5A:
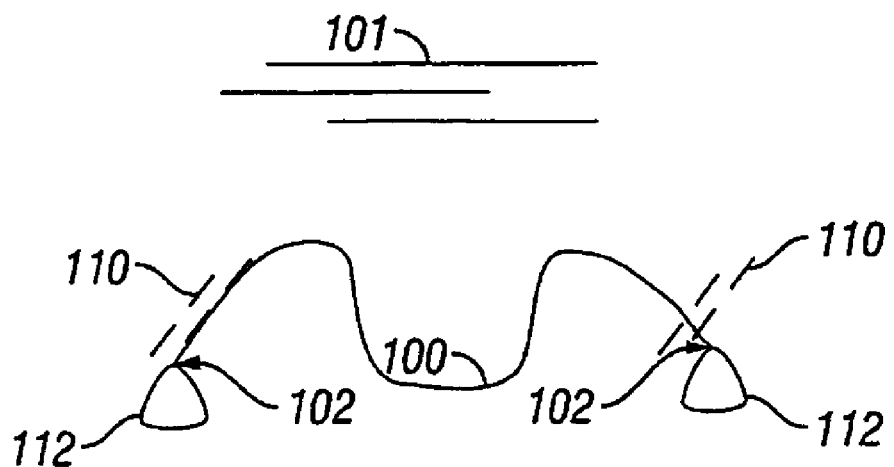
FIGS. 5A and 5B illustrate a technique for manipulating elongated nanoparticles using a cloud of particles to form a nanohandles.
Figure 5B:
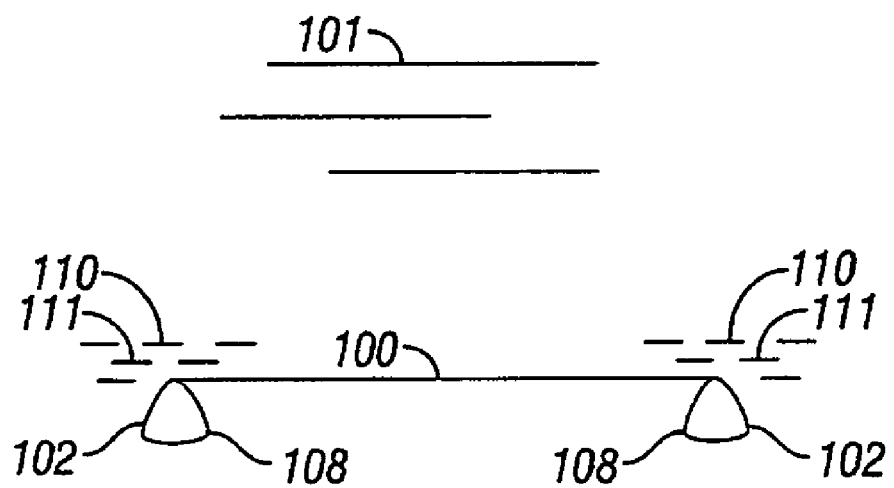

FIGS. 5A and 5B illustrate an arrangement similar to the previous illustration, except that in this arrangement nanoparticles 110 are suspended in a liquid medium 101 with the nanotubes 100. The ends 102 of the tubes 100 are targeted and captured in optical traps 112 along with the nanoparticles 111, such that the nanoparticles 110 coalesce or clump about the ends 102 to form nanhandles 110' which facilitate the manipulation of the tube. It should be understood that other nanostructures may be manipulated in accordance with the examples of FIGS. 4 and 5. In addition, other forms of manipulation, sorting, deposition, and removal of nanomaterials may be achieved as hereinafter discussed.

Figure 6A:
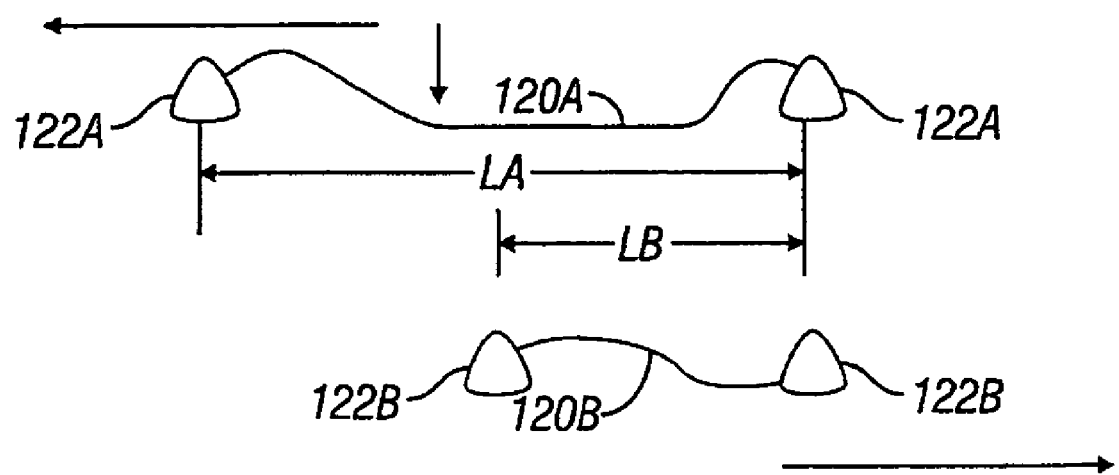
FIGS. 6A-6B illustrate various techniques whereby elongated nanoparticles may be modified by stretching and wherein multicomponent particles may be separated.

FIG. 6A illustrates an arrangement in which different nanostructures 120A and 120B are located in a common medium. The structures may be nanotubes of various lengths or other structures having sensible properties. In FIG. 6A, the property of interest is the length of the nanostructures 120A and 120B. Nanostructure 120A having the length la is captured by a pair of spaced apart optical traps 122A. The spacing corresponds to the length of the nanoparticle 120A. Likewise, nanoparticle or structure 120B having the length LB is captured by a pair of appropriate spaced apart optical traps 122B. The length or shape of the traps makes it possible to differentiate between the nanostructures of different lengths, so that they may be separated by capturing them and moving them to separate locations.

Figure 6B:
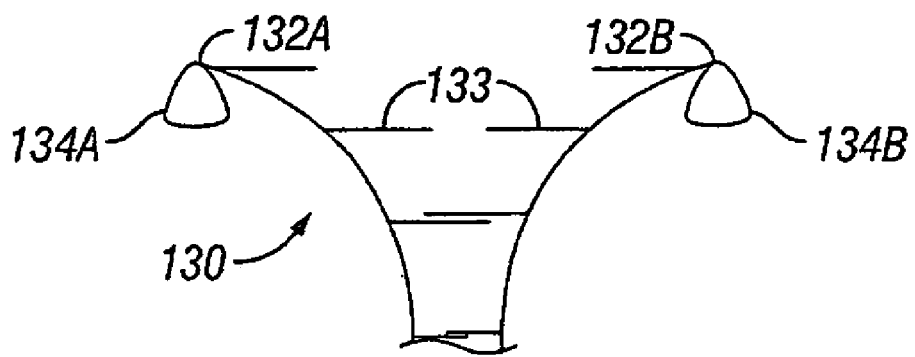

FIG. 6B, illustrates a multi-component nanostructure An exemplary structure could be, for example, a DNA molecule 130, which may be separated into separate strands 130A and 130B by securing the corresponding end 132A and 132B of each respective strand by an optical trap 134A and 134B and moving the traps apart as shown. The pull force of the traps separates the strands and overcomes base pair bonds 133.

It should be understood that the above teachings may be employed to enhance the separation process by attaching colloidal spheres or nanohandles to the ends of the strands as well.

Figure 7A:
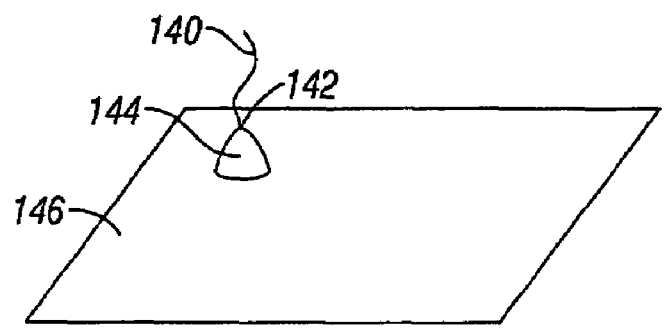
FIGS. 7A-7C illustrate techniques whereby nanoparticles may be attached to other structures in a selected pattern or orientation.
Figure 7B:
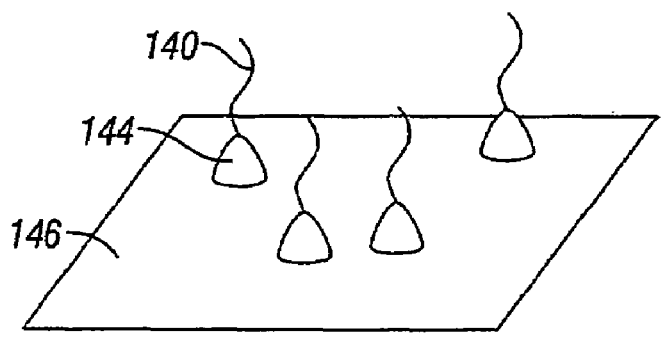

FIG. 7A illustrates a technique whereby a nanostructure such as a nanotube 140 has its end 142 captured in the optical trap 144. In FIG. 7B, one captured end of the tube 140 may be manipulated so that the end 142 is secured to a compatible surface 146. In this way, one or more nanotubes may be secured or deposited on the surface in parallel axial alignment normal to the surface and with the free ends thereof separated from the surface 146 as illustrated.

Figure 7C:
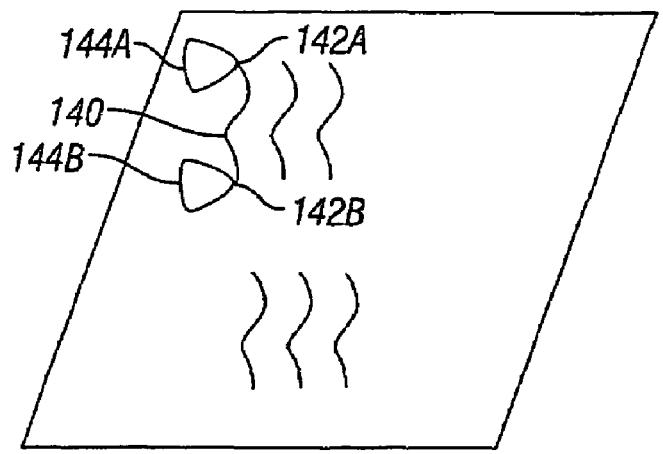

Alternatively, in FIG. 7C both ends 142A-142B of the nanotubes 140 may be captured in a corresponding optical trap 144A-144B and the ends may be manipulated so that each tube is attached to deposited on the substrate 146. In this example, the tubes are arranged in a symmetrical pattern in parallel axial alignment in the plane of the surface 146.

Figure 8A:
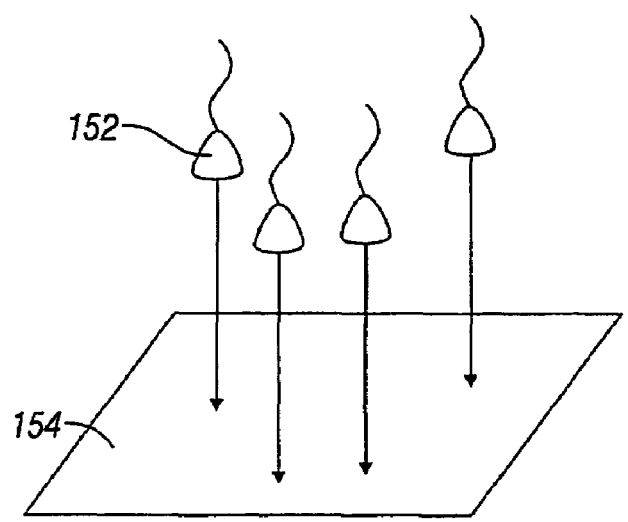
FIGS. 8A-8E illustrate techniques whereby particles may be deposited on a surface and whereby deposited particles or other materials may be modified by removal of material such as by etching.
Figure 8B:
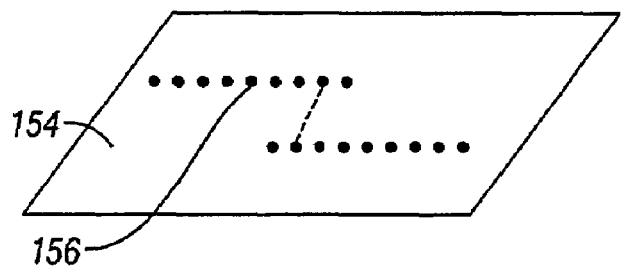
Figure 8C:
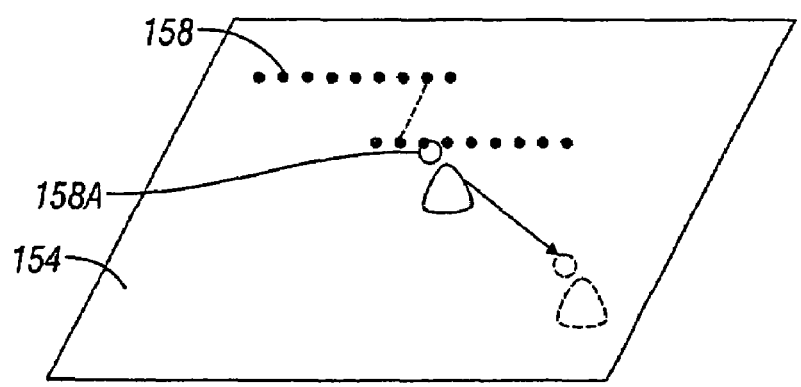

As shown in FIG. 8A, nanomaterial comprising clumps of elemental gold may be deposited in lines forming extremely thin gold conductors. Gold nanoparticles 150 may be trapped in optical trap 152 and transported for deposition to the substrate 154 in a selected pattern 156 (FIG. 8B). Alternatively, as shown in FIG. 8C, a pattern 158 may be modified or refined. The pattern 158 which may be produced as described above or by other processes such as photolithography has an artifact 158A. The artifact may be attached to the pattern or may be located somewhere close to the pattern. The artifact may be removed by employing optical trapping techniques to ablate or remove the artifact from the surface 154.

Figure 8D:
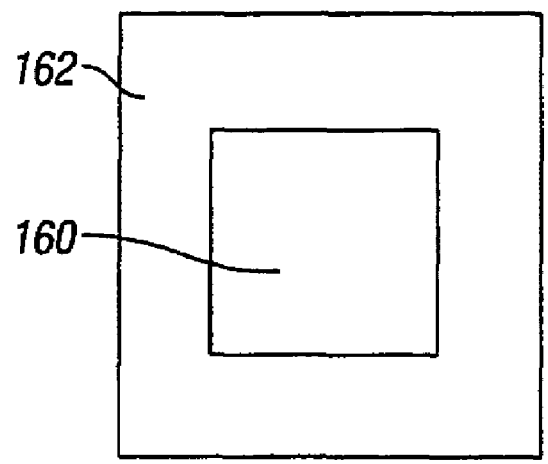
Figure 8E:
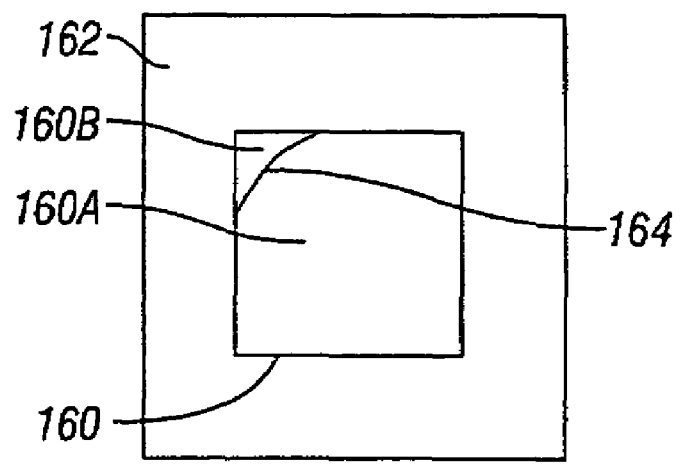

In FIG. 8D, an electrode 160 is deposited on substrate 162. The electrode is in the form of a rectangle. In FIG. 8E, the electrode is etched or ablated along the line 164 to electrically separate the electrode 160 into areas 160A and 160B.

Figure 9A:
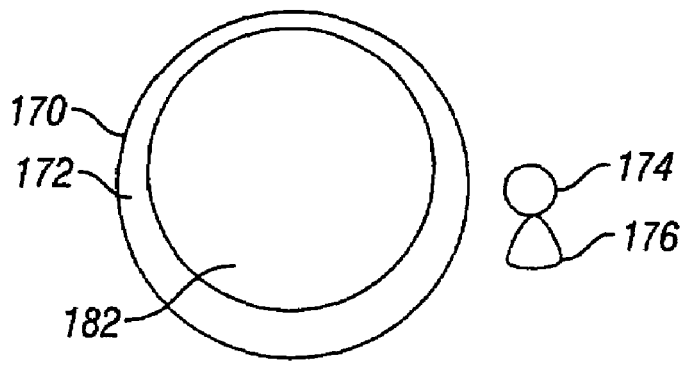
FIGS. 9A-9F illustrate techniques whereby nanoparticles may be inserted into or imbedded in the wall of a cell.
Figure 9B:
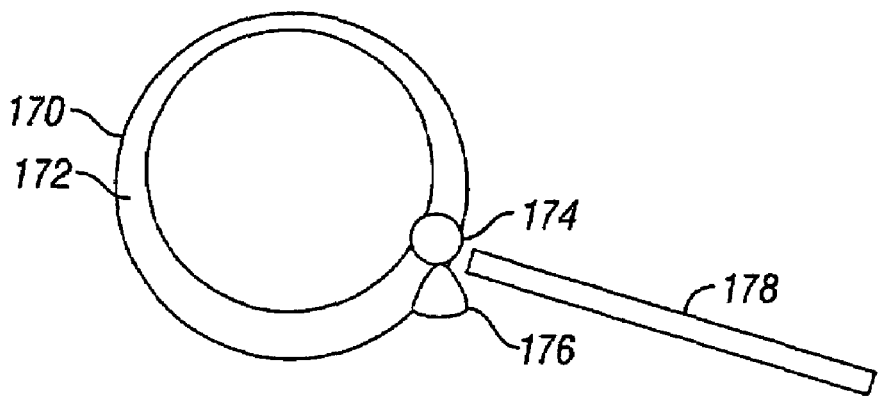
Figure 9C:
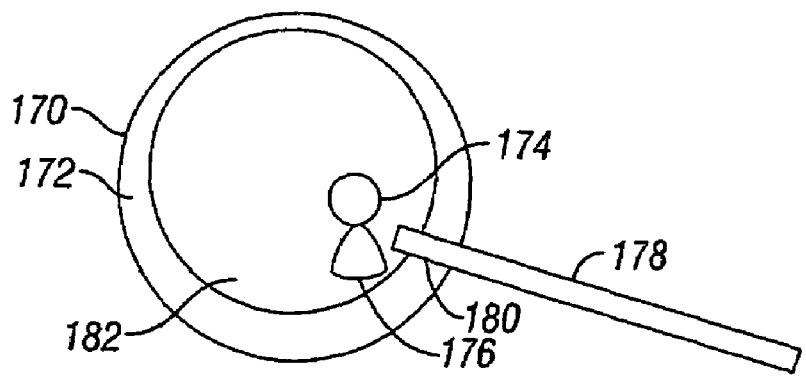

In another illustration, nanoparticles, microparticles, picoparticles or other objects may be inserted into or attached to other objects. For example, in FIG. 9A, a cell 170 has a cell wall or membrane 172. Nanoparticle for example, a gene 174 is positioned adjacent to the wall 172 by an optical trap 176. Thereafter, an energetic beam of light 178, for example a laser beam, may be employed to target the gene 174 (or other polymer or particle of DNA or RNA) adjacent to the cell wall 172. When the laser beam is directed at the particle, the beam pressure imbeds the gene 174 into the cell wall 172, (FIG. 9B), or if the beam pressure is increased sufficiently, the beam forms an aperture 180 in the cell wall 172 transporting the gene 176 to the interior 182 of the cell (FIG. 9C). Alternatively, trap 176 may be used to move the particle 174 into position.

Figure 9D:
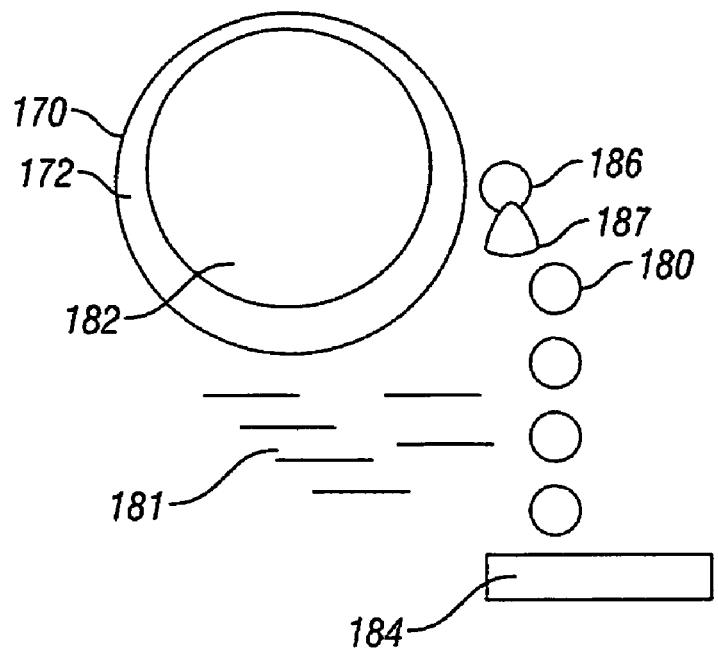
Figure 9E:
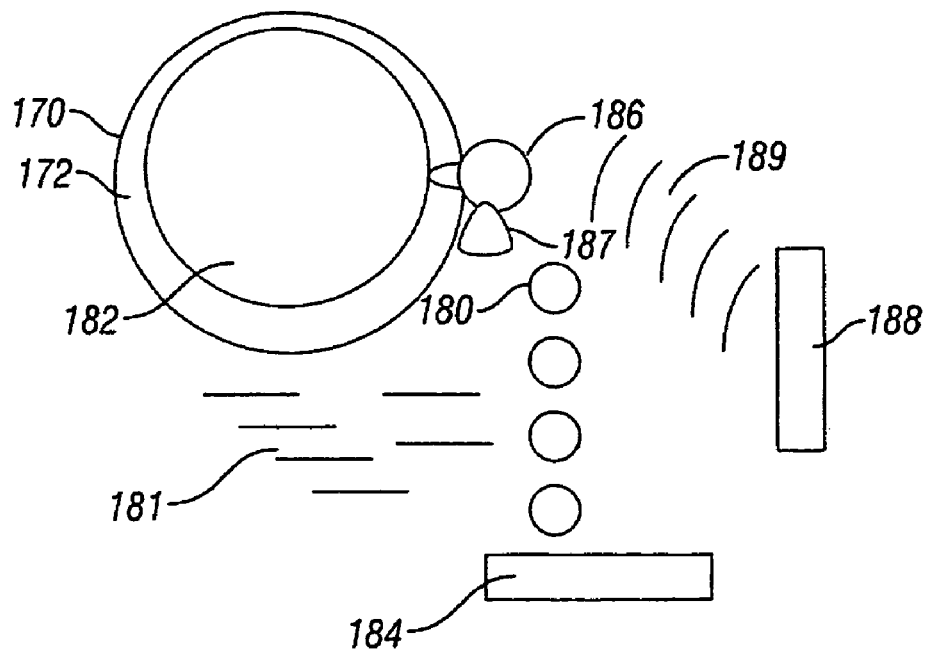
Figure 9F:
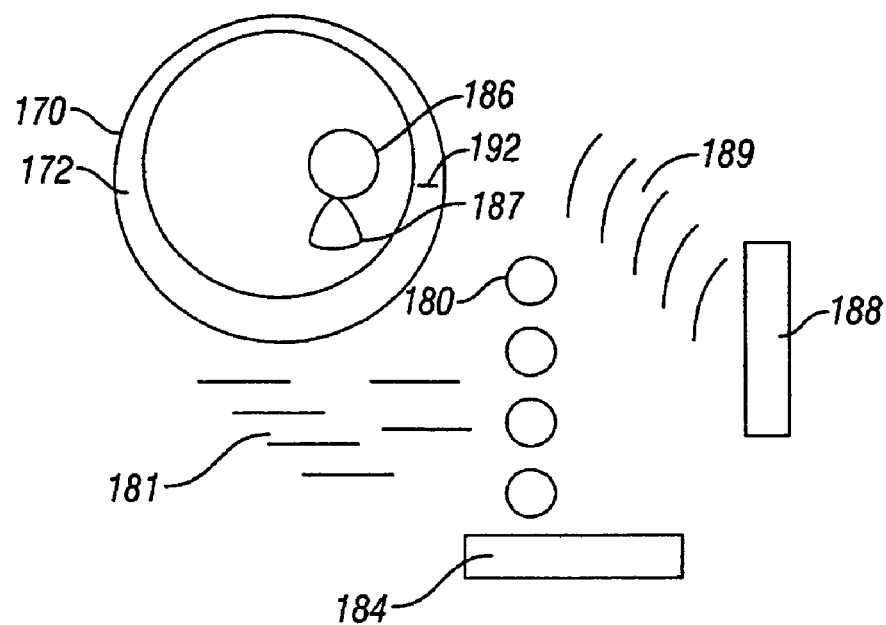

FIGS. 9D-9F illustrate an embodiment of the invention for piercing or cutting the cell wall 172. In the arrangement, one or more nanobubbles 180 are generated in a volume of fluid 181. The bubbles 180 may be generated by a source 184 such as an ultrasonic source or a heater. Nanobubble 186 may be optically trapped and held in position adjacent to the cell membrane 172 by trap 187. An acoustic source 188 provided in the fluid medium 181, produces when activated, a shock front 189 in the medium (FIG. 9E). The acoustic front 189 deforms the trapped nanobubble and produces a proboscis 190 in the bubble wall, which pierces the cell membrane 172. The depth of penetration of the proboscis may be controlled to cut through the cell wall (FIG. 9F) or to simply provide an opening for imbedding a nonoparticle in the wall. For example, a gene segment or other nanostructure may be optically trapped outside the cell and thereafter positioned in and through the opening 192 in the cell wall as shown.

Figure 10A:
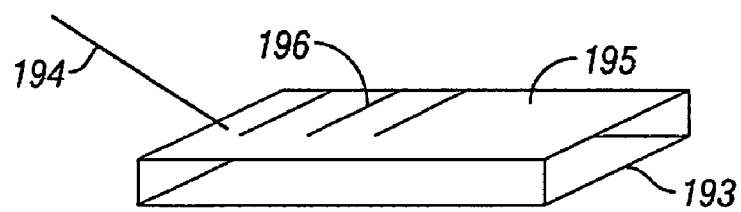
FIGS. 10A-10D illustrate techniques whereby nanochannels may be formed in the surface of a body.
Figure 10B:
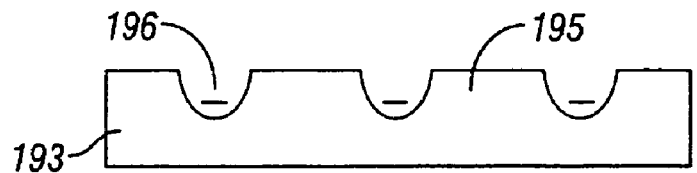
Figure 10C:
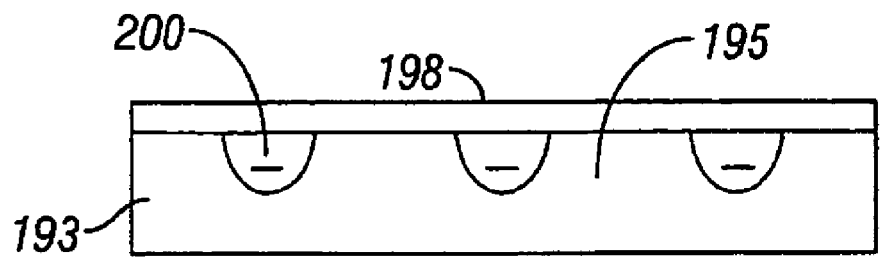
Figure 10D:
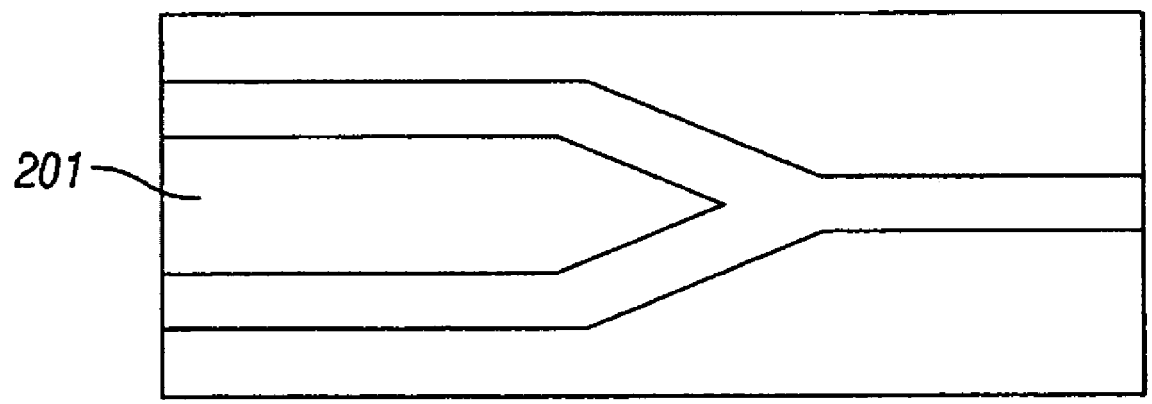

FIGS. 10A-10D illustrates a technique where channels or other nano features may be formed on and in the surface of an object 193. An energetic beam of laser light 194 is directed at the surface 195 of the object 193. The beam 193 dislodges loosely bonded particles or with higher energy etches the surface 192 forming nanochannels 196 therein (FIGS. 10A-10B). Thereafter, a cover plate 198 may be secured to the upper surface 192 of the object as shown in FIG. 10C, forming closed channels 200. The channels may take various forms and may be interconnected to form manifolds or other patterned channels 203 to form micro-fluidic devices (FIG. 10D).

Figure 11A:
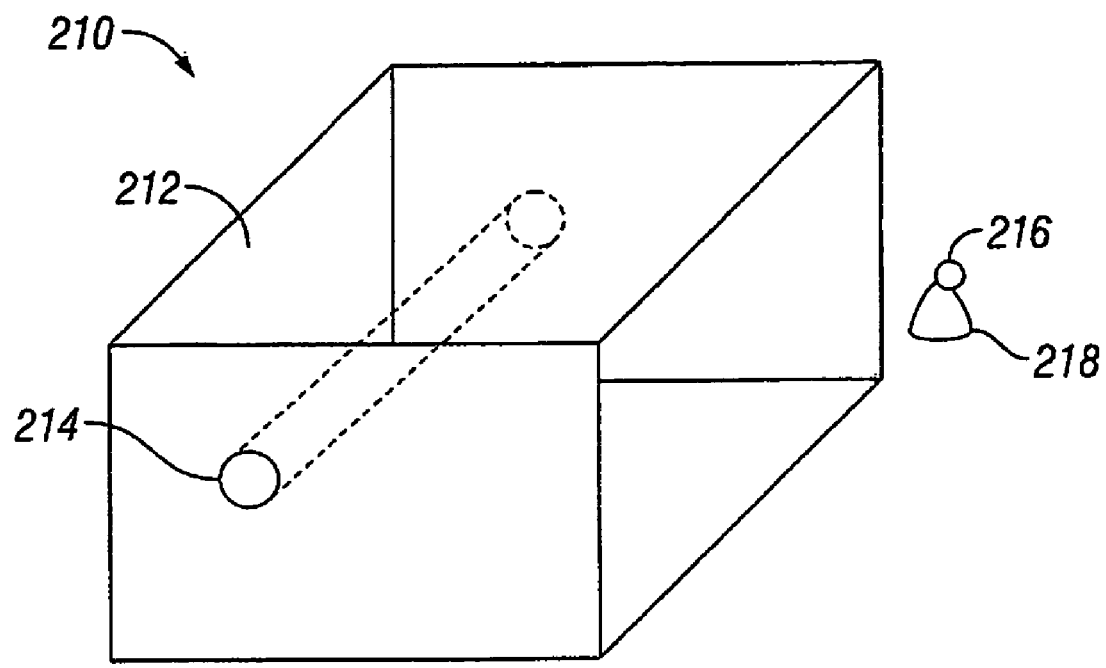
FIGS. 11A-11B illustrate a technique whereby a nanoparticle may be manipulated to form a zepto-syringe.
Figure 11B:
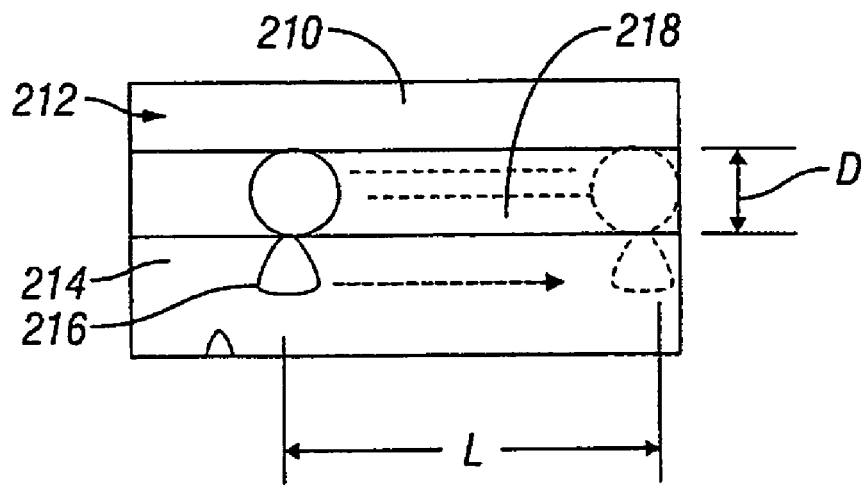

FIGS. 11A-11B illustrates a nanodevice 210 for delivering nano quantity of reagent to a downstream location. The device 210 comprises a block material 212 having a channel 214 formed therein. A nanosphere 216, sized to fit within the nanochannel 214, may be captured in trap 216 and located in the channel 214 along with a quantity of reagent 218 (FIG. 11B). The nanosphere 216 may be optically trapped within the channel 216 and moved back and forth therein in the direction of the arrow. Nanochannel 214 having a length L and a diameter D defines a volume. By moving the sphere over length l in the nanochannel 214, a measured amount of reagent 218 may be displaced. Such a device is capable of delivering extremely small quantities of reagent (e.g. zepto liter).

Figure 12A:
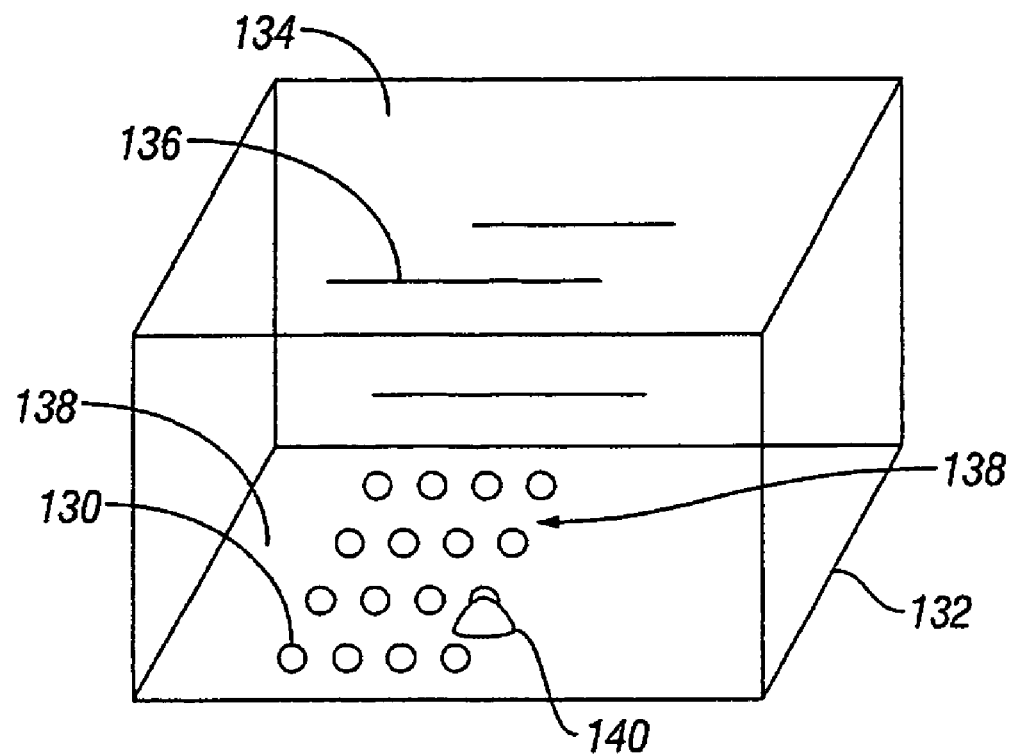
FIGS. 12A-12E illustrate techniques whereby nanoparticles may be selectively trapped and heated in a fluid medium in order to establish selected flow patterns and wherein such selective heating may be employed in a nanofluidic device.
Figure 12B:
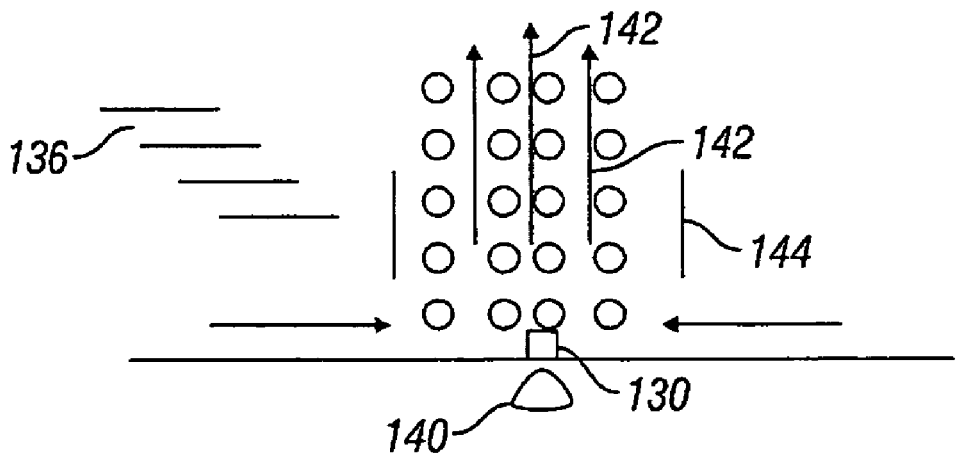
Figure 12C:
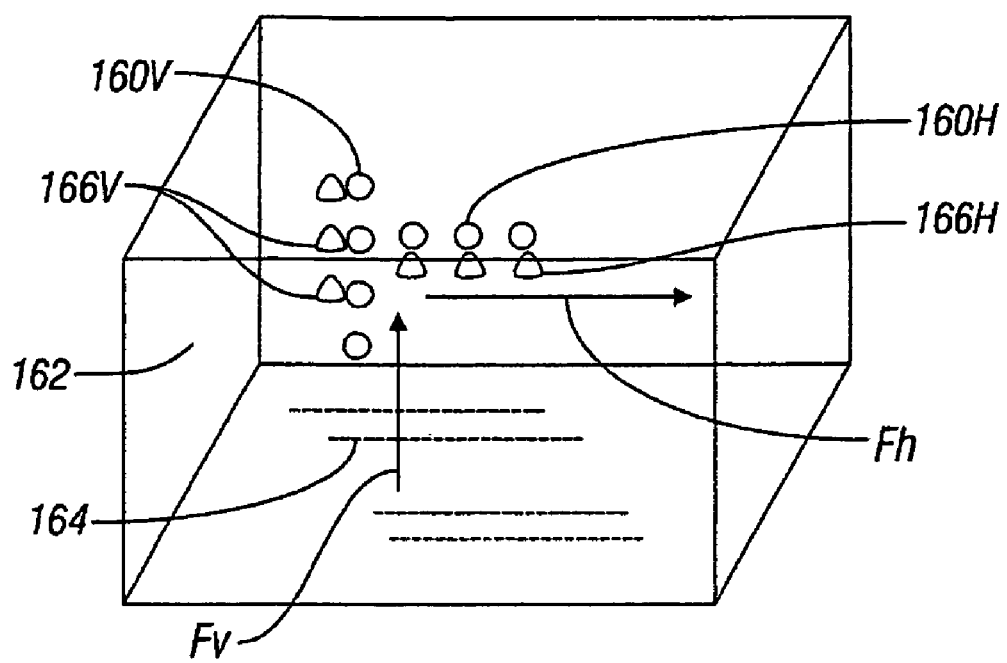

FIGS. 12A-12C illustrate another embodiment of the invention, wherein nanoparticles 130 may be deposited by optical trapping on surface 132 within a space 134 containing a fluid medium 136. The nanoparticles may be patterned. In the exemplary embodiment, the nanoparticles are disposed in a 4×4 pattern 138. If the particles 130 are thermal absorbers (i.e. the particles absorb energy preferentially to the medium) then by selectively illuminating the particles in the pattern with a laser beam or trap 140, various flow patterns may be set up in the medium.

In FIG. 12B, particle 130 is illuminated by optical trap 140. The particle absorbs energy heating the adjacent medium 136 and causes convective flow 142 therein.

As illustrated, medium 136 may have other nanoparticles 142 dispersed therein. These may also be attracted to the trap 140 by the light or by the fluid flow or both. By varying the energy supply to the trap, desired convective and particle flows may be established. It may also be possible to trap suspended particles with another trap 146 (FIG. 12C) while maintaining circulation of the fluid within the volume.

FIG. 12C illustrates flow control in a three dimensional arrangement. A pattern of traps 160 is established in a volume 162 of medium 164. The particles 160 may be located in selected positions by traps 166. In the arrangement, vertically disposed particles 160V cause vertical flow (arrow V) in the medium. Horizontally disposed particles 166H cause a horizontal flow (arrow H). Such selective trapping patterns may be employed to establish and vary corresponding vertical and horizontal heating and flow patterns FV and FH in three dimensions.

Figure 12D:
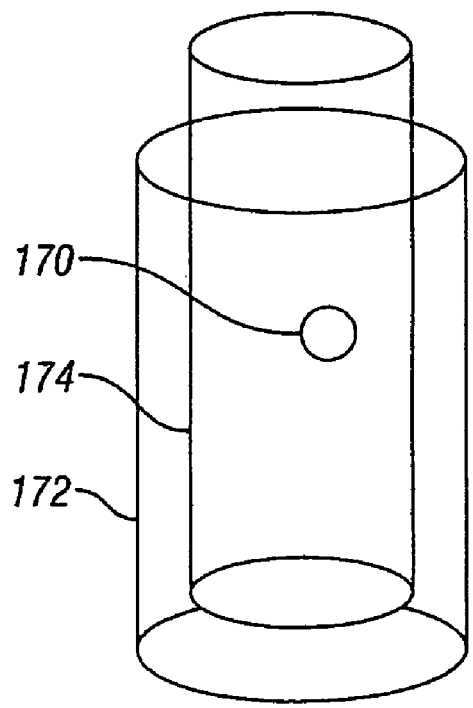

In an exemplary embodiment, FIG. 12D, a particle 170 may be trapped in a Bessel trap 172 (optical bottle), the interior of which is relatively cool. If a point trap 174 is superimposed on the Bessel trap, the interior becomes illuminated and the particle 170 may absorb energy and produce fluid flow independent of the Bessel trap or bottle.

Figure 12E:
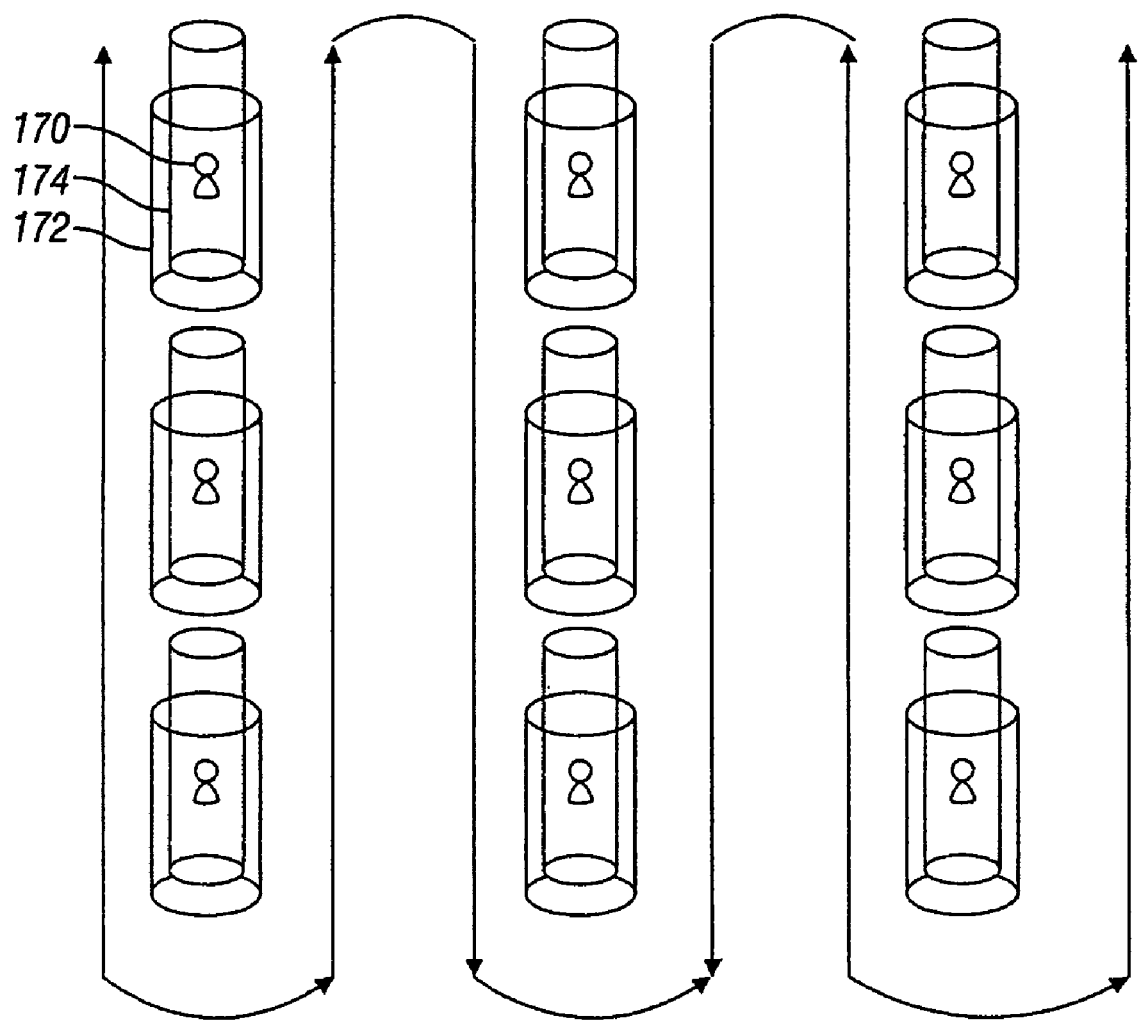

Referring to FIG. 12E, other flow patterns may be established an arrangement of multiple traps wherein particles 170 may be located in Bessel traps 174 and wherein alternating columns of traps may be further illuminated by point traps 174 to create upward flows. The particles in alternating columns remain relatively cool. As a result, downward convective lows F may be produced in large and varied patterns.

Figure 13A:
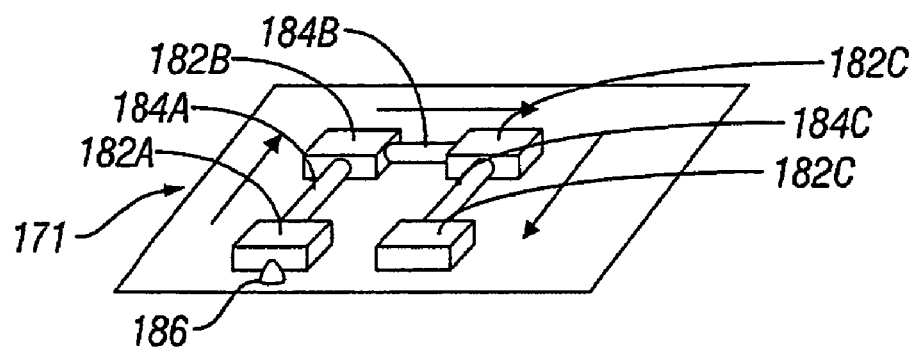
FIGS. 13A-13E illustrate techniques whereby nanoparticles may be selectively heated in order to affect the bulk characteristics of a body and to thereby selectively control flows in nanochannels formed therein.

FIG. 13A schematically illustrates a lab on chip 180 having chambers 182A-182D interconnected by channels 184A-184C. Flow patterns may be established to move fluid and particles within the chambers sequentially among various chambers 182A-182D. Optical trap 186 may employed to trap particles and move the particles variously among the chambers. Alternatively, thermal flows, such as described in FIG. 12B, may be established within the one more the various chambers causing flow patterns among the chambers.

Figure 13B:
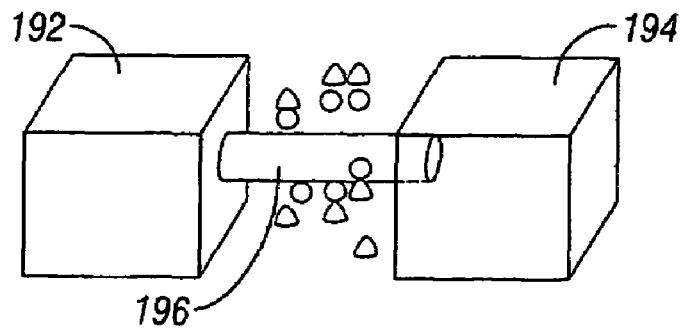
Figure 13C:
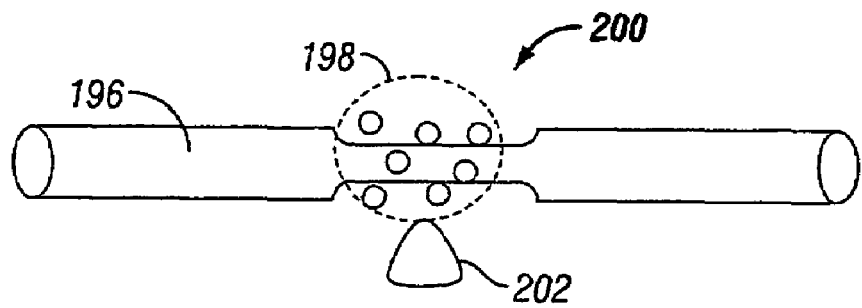

FIG. 13B illustrates a block 190 having chambers 192 and 194 therein. The chambers 192 and 194 are connected by a channel 196. Flow occurs between chambers via the channel. The material forming the block 190 may be resilient polymer material such as PDMS having absorbent nanoparticles 198 dispersed therein. If the nanoparticles in the region 200 adjacent to the channel 196 are targeted by an optical trap 202, the particles absorb energy causing the material in the vicinity of the channel to expand, thereby causing the channel to close (FIG. 13C). When the trap is off, the material cools and the channel 196 opens.

Figure 13D:
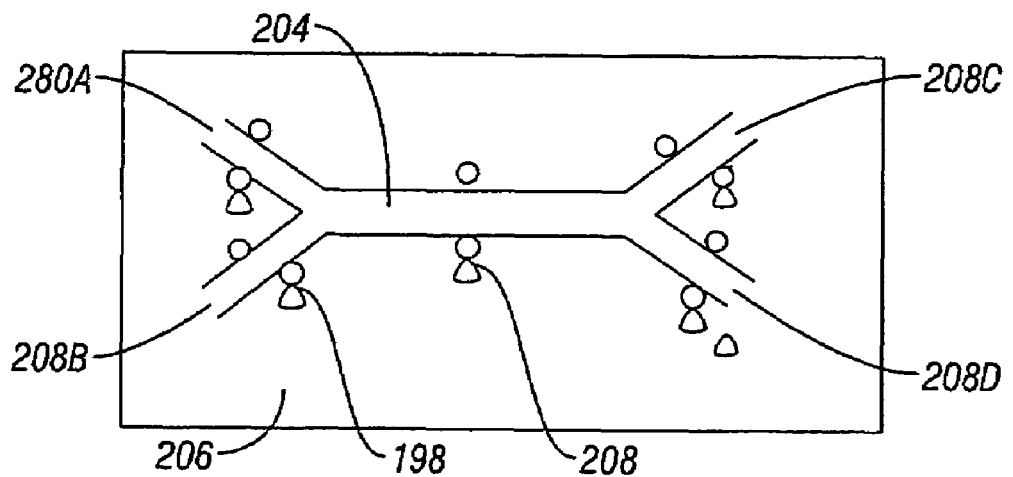

FIG. 13D illustrates an arrangement where a channel 204 formed in a body 206 has multiple feeds 208A-208D. Each feed and channel may be targeted by a trap 209 whereby the traps may be selectively applied.

Figure 13E:
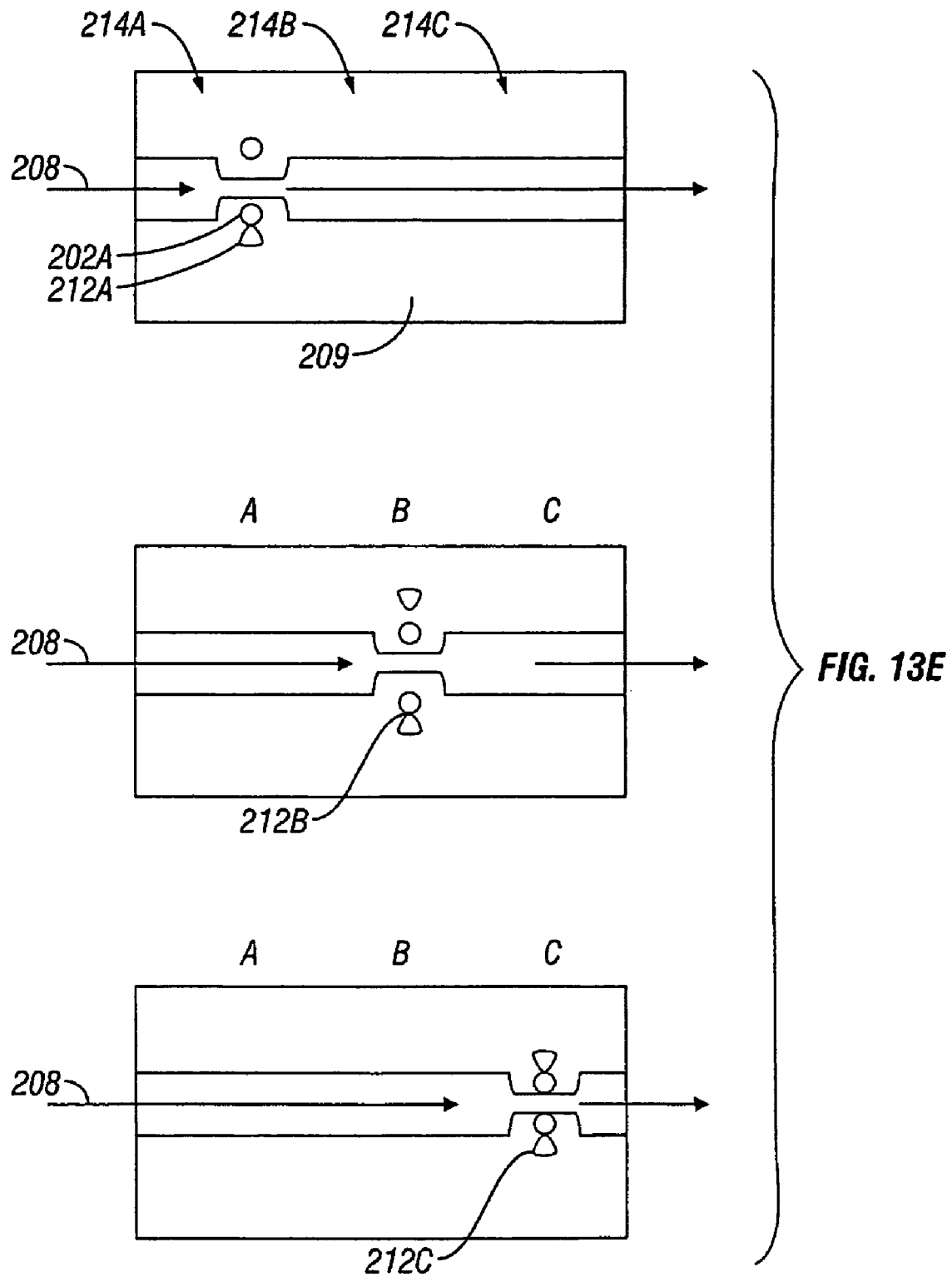

FIG. 13E illustrates an arrangement where a channel 210 is formed in body 211 Traps 212A-212C are applied selectively at locations 214A-214C. If the traps are activated in sequence, (e.g., 212A ... 212B ... 212C ... 212A ... ) the channel 200 walls close in a corresponding sequence at locations 214A ... 214B ... 214C ... 214A ... ). Likewise, when each trap is off the corresponding part of the channel walls reopen. Thus flow occurs by peristaltic action along the channel.

In FIGS. 13A-13E, it is also possible to pulse the laser in the region of the channel to cause pumping action in the channel. For example, if one or more trap locations are established along the channel, periodically turning the laser trap on and off causes fluctuation in the pressure within the channel, which when combined with upstream or downstream pulsation, peristaltic pumping may be achieved.

Figure 14A:
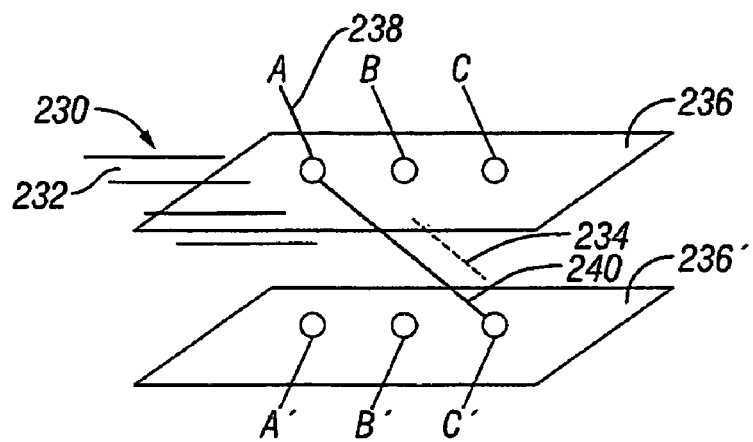
FIGS. 14A-14G illustrate techniques whereby nanoparticles may be formed into conductive strands having selectable electrical characteristics.

FIG. 14A illustrates another embodiment of the invention in which a volume 230 of fluid media 232 contains a concentration of nanoparticles 234 suspended therein. Surfaces 236 and 236' are formed with corresponding contacts A, B, C, and A', B', C'. An optical trap such as a Bessel beam 238 is established between contacts A and C'. As a result, nanoparticles 234 collect and agglomerate along the path 240 interconnecting contacts A and C' as shown.

Figure 14B:
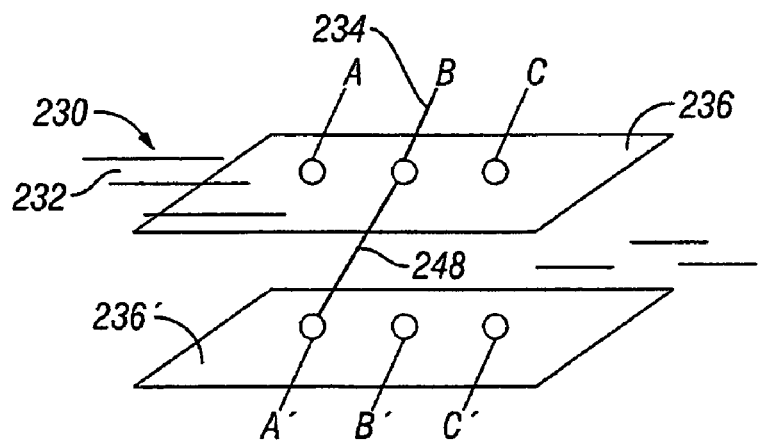

In FIG. 14B, the Bessel beam 244 generates conductive path 248. The path 248 connects contacts B and A'. Bessel beams may be selectively activated and deactivated whereby various other conductive paths may be established between the surfaces.

Figure 14C:
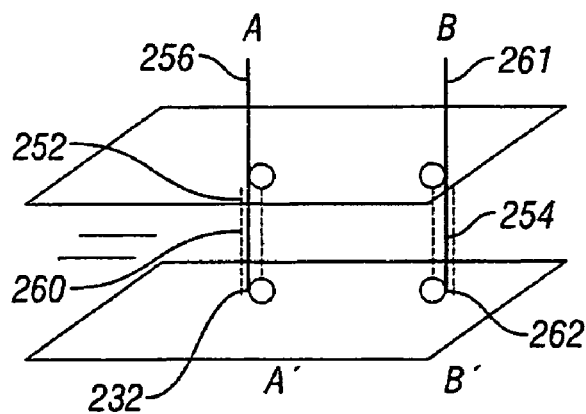

FIG. 14C illustrates an embodiment of the invention in which the fluid medium 250 contains two types of nanoparticles 252 and 254. In the arrangement illustrated, the particles 232 have a selected conductivity, different than the conductivity of the nanoparticles 254. Bessel beam 256 may be adapted to attract conductive particles 252, forming a conductive path 260 between contact points A and A'. Likewise, Bessel beam 261 may be adapted to attract nanoparticles 254 based upon conductivity size, chirality, or other feature, so as to establish a path 262 between contact points B and B'. The conductivity of paths 260 and 262 may differ accordance with the respective conductivity of the nanoparticles.

Figure 14D:
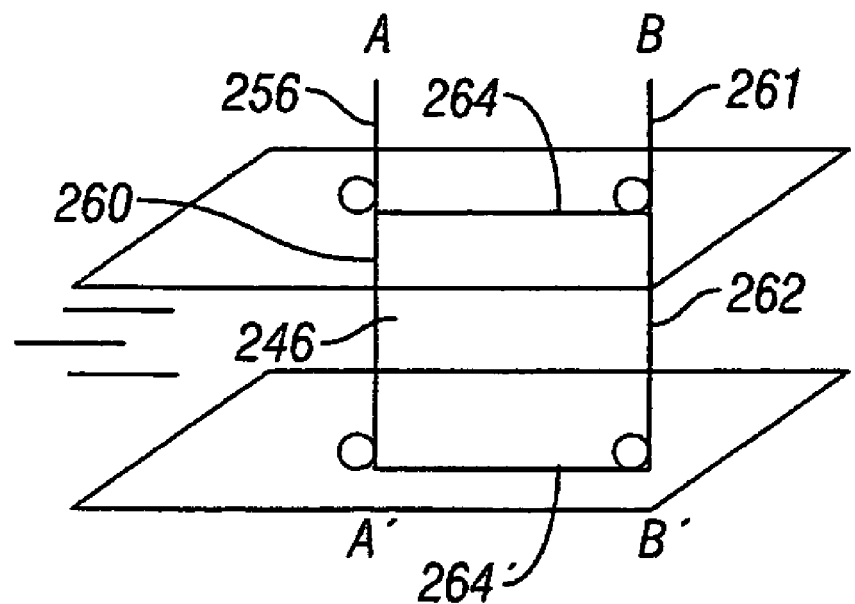

In FIG. 14D, conductive paths 264 and 264' may be established between contacts A-B and A'-B' respectively. As a result, the conductive paths 260, 264 together establish a conductive path through the medium and between the surfaces which manifests itself and as a combined parallel resistance.

Figure 14E:
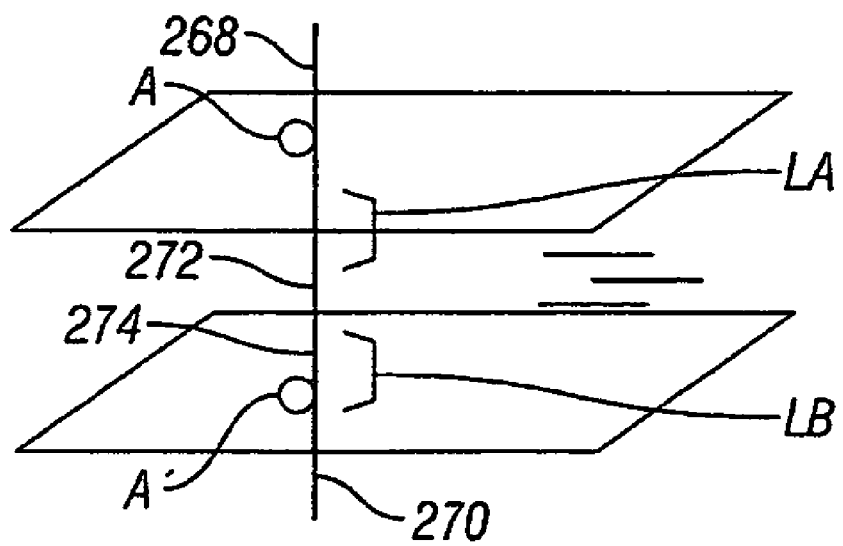

In FIG. 14E, Bessel beams 268 and 270 may be configured to produce conductive paths 272 and 274. The conductive path 272 may be formed of the lower resistance nanoparticles, and the conductive path 274 may be formed of a less conductive nanoparticles, thereby forming a series resistance. The respective lengths LA and LB of the respective conductive paths 272 and 274 may be varied as to establish a variable resistance between the surfaces.

Figure 14F:
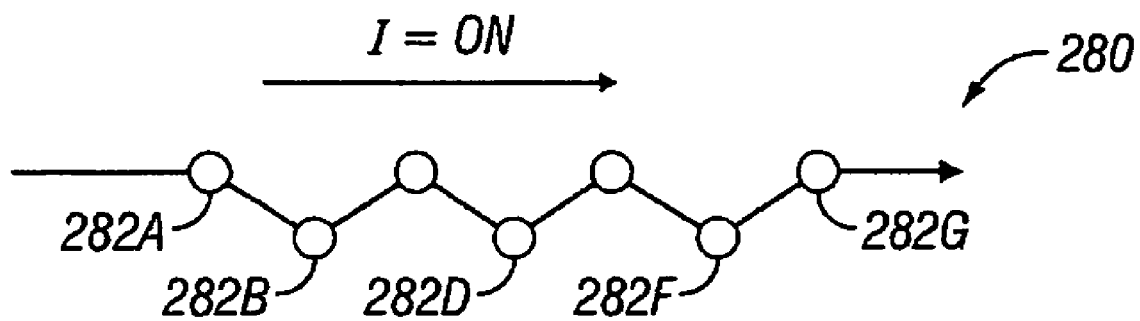

FIG. 14F illustrates a switchable wire 280 comprising a plurality of nanoconductors 282A-282G. The conductors are trapped in Bessel beam 264 in sufficient proximity to support a current.

Figure 14G:
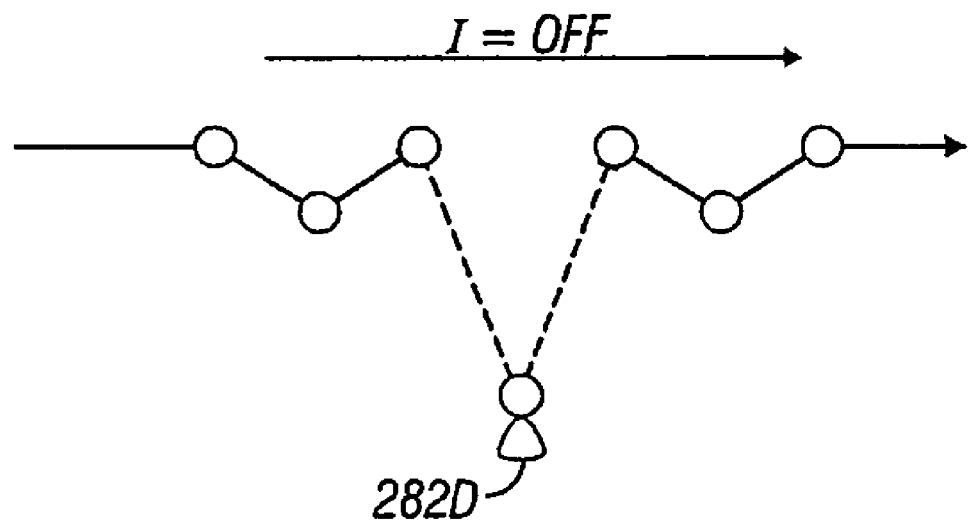

In FIG. 14G, the Bessel beam is off and one or more of the nanoconductors, e.g. 282D diffuses therby causing the circuit to open. The current in this example is open and the current is zero. If the beam is switched back on the conductor 282D is pulled into proximity thereby allowing the current to flow.

Alternatively, the Bessel 284 beam may be left on, and nanoconductor 282D may be switched by point trap 288 between the proximate position within the beam, as shown, where the current is on; and the position, shown in phantom line, outside the beam where the current is zero.

Figure 15:
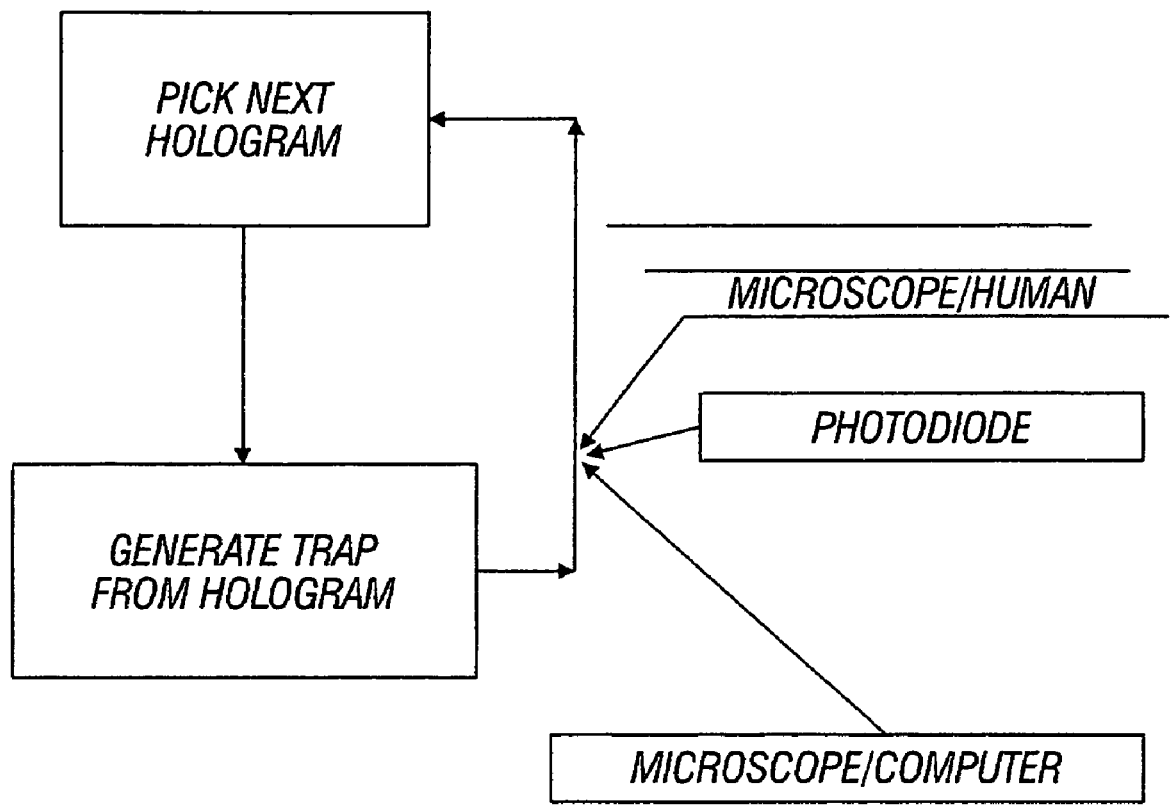
FIG. 15 illustrates a block diagram for performing the method according to the invention.

FIG. 15 illustrates an exemplary embodiment of the invention in which the method is exemplified. According to the invention, nanoparticles are trapped and manipulated using a holographic technique hereinabove described. However, the implementation of the invention is not achieved simply by assembling the equipment described. In order to successfully trap nanoparticles in a practical and efficient way, it is necessary to use the Dynamic Optical Element (DOE) such as a spatial light modulator (SLM) or digital light processor (DLP) to generate holograms having characteristics which are related to the characteristics of the nanoparticles. In other words, it is necessary to find such holograms which best achieve the desired functionality.

The method according to the invention allows for the practical implementation of desired manipulation of nanoparticles. In the exemplary embodiment the method is implemented by capturing and manipulating nanomaterial particles having one or more nanocharacteristics with an optical trap formed by modulating a laser beam with dynamic optical element (DOE). At least one characteristic of the nanomaterials is selected. Such characteristic may be size, conductivity, chiliarity, refractive index or the like. A laser beam is generated having a selected wavelength corresponding to the at least one selected characteristic of the nanomaterial. Calculated values for the DOE, corresponding to the at least one selected characteristic of the nanomaterial are selected. The beam is modulated with the DOE to produce a holographic optical trap having properties corresponding to the at least one selected characteristic. In the exemplary embodiment, the trap is focused to a spot size of about ¼ the selected wavelength; and the beam focus is located near a particle for trapping the particle therein.

The method is implemented in a practical way by employing the DOE as a tool to find the most useful, stable and highly functional traps. To this end, a hologram is selected. Then a trap is generated from the hologram. The resulting trap functionality is observed by the human observer or an automated observer or the like and depending on the results, a further hologram is selected. The process continues until the observer is satisfied that a sufficiently functional, stable and useful trap is produced.

The method improves on prior art techniques in that such techniques do not use the DOE as a tool to find optimally functional and stable traps. Indeed, the potential combinations of calculations for practical holograms is a huge number with practically unlimited combinations. Accordingly, unless a high speed DOE coupled with a sufficiently powerful processor is used, it is unlikely that one could practically achieve optical trapping of nanoparticles. In the invention, however, the DOE and computer drive are used to find the characteristics for hologram calculations based on the characteristics of the nanoparticles. Prior art systems rely on trial and error by simply using known arrangements without tailoring the hologram calculations to the particle characteristics. Thus, the amount of time saved using the method of the invention has allowed for the development of many techniques for the manipulation of nanoparticles in a practical time frame.

Products

The invention also includes products produced in accordance with the methods and apparatus disclosed herein. For example, the invention comprises products produced by manipulation of particles using a laser beam modulated by a dynamic optical element to produce an optical trap. The invention comprises products produced by an apparatus for manipulating particles using such a laser beam and modulating dynamic optical element. In an exemplary embodiment, the invention comprises a structure formed by manipulating nanotubes using the methods and apparatus described and attaching the nanotubes to form such structures.

While there have been described what are considered to be exemplary embodiments of the invention, it will be apparent to those skilled in the art that various modifications may be made therein, and it is intended in the appended claims to cover such modifications and changes as fll within the scope thereof.

What is claimed is:

1. A method of manipulating materials in a fluidic medium, comprising:
   utilizing an optical trapping apparatus by modulating a laser beam with a Dynamic Optical Element (DOE) to produce optical traps;
   depositing the materials onto a surface in the fluidic medium; and
   selectively illuminating the materials in the fluidic medium with one of said laser beam or said optical traps;
   wherein the materials are thermal absorbers and are selectively illuminated in the fluidic medium to form selected flow patterns in the fluidic medium.

2. The method according to claim 1, wherein said materials are graphite particles.

3. The method according to claim 2, further comprising:
   depositing absorbing patterns of said materials onto said surface in said fluidic medium which allows directed heating of said surface anywhere along said patterns.

4. The method according to claim 2, further comprising:
   depositing a thin coating of a material over said surface that absorbs laser radiation, allowing directed heating at any location on said surface, and which allows predetermined fluidic flows.

5. The method according to claim 2, wherein said fluidic medium absorbs heat in a two-photon process, which allows preferential heating at locations where optical traps are presented.

6. The method according to claim 1, further comprising:
   varying an energy supply to said optical traps to produce selected convective and material flows.

7. The method according to claim 1, wherein said materials comprise one or more of nanoparticles, microparticles and picoparticles.

8. The method according to claim 1, wherein the materials comprise at least one of a nanotube, agglomerated elemental gold, platinum, titanium, DNA, a thermal absorber, colloidal spheres, polymers, bio polymers, quantum dots, pharmaceuticals, or bio materials.

9. The method according to claim 1, wherein a mode of the laser beam comprises at least one of a Gaussian distribution, a Bessel distribution, a point distribution, an optical bottle, and an optical vortex.

10. A product produced by the process of claim 1.

11. A method of manipulating materials in a fluidic medium, comprising:
   utilizing an optical training apparatus by modulating a laser beam with a Dynamic Optical Element (DOE) to produce optical traps;
   selectively illuminating the materials in said fluidic medium with one of said laser beam or said optical traps;
   wherein said materials are thermal absorbers;
   wherein the materials are selectively illuminated in the fluidic medium to form selected patterns in the fluidic medium; and
   trapping one of the materials in a Bessel trap;
   superimposing an optical trap on said Bessel trap thereby illuminating an interior of said Bessel trap; and
   producing fluidic flow in said Bessel trap independent of said Bessel trap.

12. The method according to claim 11, wherein said materials absorb energy to produce said fluidic flow.

13. The method according to claim 12, wherein a plurality of Bessel traps produces a plurality of selected flow patterns.

14. An apparatus for manipulating materials in a fluidic medium, comprising:
   a laser for generating a laser beam; and
   a dynamic optical element (DOE) for producing a plurality of Bessel beams in a Bessel trap;
   wherein said Bessel beams trap said materials in said Bessel trap, thereby illuminating an interior of said Bessel trap causing selected fluid flow therein; and
   wherein said fluidic flow in said Bessel trap is independent of said Bessel trap.

15. The apparatus according to claim 14, further comprising:
   a plurality of Bessel traps producing a plurality of selected flow patterns.

16. An apparatus for manipulating materials in a fluidic medium, comprising:
   a laser for generating a laser beam; and
   a dynamic optical element (DOE) for producing a plurality of optical traps;
   a plurality of surfaces disposed in said fluidic medium;
   wherein an optical traps is established between at least two of said plurality of surfaces, forming a conductive path therebetween;
   wherein the materials in the fluidic medium collect along said conductive path;
   wherein said optical traps forming said conductive paths are Bessel beams.

17. The apparatus according to claim 16, wherein the materials comprise at least two types of particles, each of the particles having a selected conductivity different from one another, and selected of the two materials are attracted to different conductive paths.

18. The apparatus according to claim 16, wherein said particles are attracted to said conductive paths based upon one of conductivity size or chirality.

19. The apparatus according to claim 16, wherein said different conductive paths together establish a conductive path through the fluidic medium and between said surfaces which manifests as a combined parallel resistance.

20. The apparatus according to claim 16, wherein one of said conductive paths includes lower resistance particles, and the other of said conductive paths includes lower conductive particles, thereby forming a series resistance.

21. The apparatus according to claim 16, wherein lengths of said respective conductive paths are varied to establish a variable resistance between said surfaces.

22. The apparatus according to claim 16, further comprising:
a switchable wire comprising a plurality of conductive particles;
wherein said conductive particles are trapped in Bessel beams in sufficient proximity to support a current.

23. The apparatus according to claim 16, wherein when the Bessel beams are turned off, at least one of the conductive particles diffuses, causing a circuit to open, and stopping any current.

24. The apparatus according to claim 16, wherein said materials comprise one or more of nanoparticles, microparticles and picoparticles.

25. The apparatus according to claim 16, wherein a mode of the laser beam comprises at least one of a Gaussian distribution, a Bessel distribution, a point distribution, an optical bottle, and an optical vortex.

26. The apparatus according to claim 16, wherein the materials comprise at least one of a nanotube, agglomerated elemental gold, platinum, titanium, DNA, a thermal absorber, colloidal spheres, polymers, bio polymers, quantum dots, pharmaceuticals, or bio materials.

27. An apparatus for manipulating materials, comprising:
an optical trapping apparatus including a laser for generating a laser beam;
a dynamic optical element (DOE) for modulating said laser beam to produce a plurality of optical traps;
wherein said DOE is a spatial light modulator or digital light processor which generates holograms having a characteristic which is related to a property of the materials; and
a computer which calculates each said characteristic of each of said holograms based on each said property of the materials, to tailor said holograms to each said property of the materials;
wherein said property is at least one of size, conductivity, chirality, or refractive index; and
wherein said laser beam is generated having a selected wavelength corresponding to said selected property.

28. The apparatus according to claim 27, wherein said calculations are repeated by said computer based on a functionality of said holograms, in order to achieve said holograms which are tailored to said property of the materials.

29. The apparatus according to claim 27, wherein the materials comprise one or more of nanoparticles, microparticles and picoparticles.

30. The apparatus according to claim 27, wherein the materials comprise at least one of a nanotube; agglomerated elemental gold; platinum; titanium; DNA; a thermal absorber; colloidal spheres; polymers; bio polymers; quantum dots; pharmaceuticals; or bio materials.

31. The apparatus according to claim 27, wherein a mode of the laser beam comprises at least one of a Gaussian distribution, a Bessel distribution, a point distribution, an optical bottle, and an optical vortex.

32. A method of manipulating materials, comprising:
utilizing an optical trapping apparatus including a laser for generating a laser beam, and a dynamic optical element (DOE) for producing a plurality of optical traps;
wherein said DOE is a spatial light modulator or digital light processor which generates holograms having a characteristic which is related to a characteristic of the materials; and
calculating each said characteristic of each of said holograms based on each said characteristic of the materials, to tailor said holograms to each said characteristic of the materials;
wherein said characteristic is at least one of size, conductivity, chirality, or refractive index; and
wherein said laser beam is generated having a selected wavelength corresponding to said selected characteristic.

33. The method according to claim 32, further comprising:
repeating said calculations based on a functionality of said holograms, in order to achieve said holograms which are tailored to said characteristic of the materials.

34. The method according to claim 32, wherein the materials comprise one or more of nanoparticles, microparticles and picoparticles.

35. The method according to claim 32, wherein the materials comprise at least one of a nanotube; agglomerated elemental gold; platinum; titanium; DNA; a thermal absorber; colloidal spheres; polymers; bio polymers; quantum dots; pharmaceuticals; or bio materials.

36. The method according to claim 32, wherein the mode of the laser light comprises at least one of a Gaussian distribution; a Bessell distribution; a point distribution; and an optical vortex.

37. A product formed by the method of claim 32.

38. A method of manipulating materials in a fluidic medium, comprising:
providing a plurality of surfaces disposed in the fluidic medium;
utilizing an optical trapping apparatus including a laser for generating a laser beam, and a dynamic optical element (DOE) for producing a plurality of optical traps;
establishing optical traps between at least two of said plurality of surfaces, forming a conductive path therebetween; and
collecting the materials in the fluidic medium along a plurality of conductive paths;
wherein said optical trays forming said conductive paths are Bessel beams.

39. The method according to claim 38, wherein the materials comprise at least two types of particles, each of the particles having a selected conductivity different from one another, and selected of the two materials are attracted to different conductive paths.

40. The method according to claim 39, wherein said particles are attracted to said conductive paths based upon one of conductivity size or chirality.

41. The method according to claim 38, wherein different conductive paths together establish a conductive path through the fluidic medium and between said surfaces which manifests as a combined parallel resistance.

42. The method according to claim 38, wherein one of said conductive paths includes lower resistance particles, and the other of said conductive paths includes lower conductive particles, thereby forming a series resistance.

43. The method according to claim 3, wherein lengths of said respective conductive paths are varied to establish a variable resistance between said surfaces.

44. The method according to claim 38, wherein the materials comprise one or more of nanoparticles, microparticles and picoparticles.

45. The method according to claim 38, wherein the materials comprise at least one of a nanotube; agglomerated elemental gold; platinum; titanium; DNA; a thermal absorber; colloidal spheres; polymers; bio polymers; quantum dots; pharmaceuticals; or bio materials.

46. The method according to claim 38, wherein the mode of the laser light comprises at least one of a Gaussian distribution; a Bessel distribution; a point distribution; and an optical vortex.

47. A product produced by the method of claim 38.

48. A method manipulating materials in a fluidic medium, comprising:
   providing a plurality of surfaces disposed in the fluidic medium;
   utilizing an optical trapping apparutus including a laser for generating a laser beam, and a dynamic optical element (DOE) for producing a plurality of optical traps;
   establishing optical traps between at least two of said plurality of surfaces, forming a conductive path therebetween;
   collecting the materials in the fluidic medium along said conducting path; and
   forming a switchable wire comprising a plurality of conductive particles by trapping said conductive particles in Bessel beams in sufficient proximity to support a current.

49. The method according to claim 48, wherein when the Bessel beams are turned off, at least one of the conductive particles diffuses, causing a circuit to open, and stopping any current.

* * * * *